United States Patent
Kotani et al.

[11] Patent Number: 6,161,989
[45] Date of Patent: Dec. 19, 2000

[54] ANTIFOULING WALL STRUCTURE FOR USE IN PIPE AND METHOD OF CONSTRUCTING THE ANTIFOULING WALL THEREFOR

[75] Inventors: Akio Kotani, Osaka; Katsuyoshi Amidaiji, Ohtake; Masatoshi Senba; Koji Morimoto, both of Yasu-gun, all of Japan

[73] Assignee: Chugoku Paints LTD, Hiroshima, Japan

[21] Appl. No.: 09/177,576

[22] Filed: Oct. 23, 1998

Related U.S. Application Data

[62] Division of application No. 08/758,820, Dec. 4, 1996, Pat. No. 5,885,029.

[30] Foreign Application Priority Data

| Dec. 4, 1995 | [JP] | Japan | 7-315583 |
| Aug. 13, 1996 | [JP] | Japan | 8-213819 |
| Aug. 13, 1996 | [JP] | Japan | 8-213820 |

[51] Int. Cl.[7] ............................................. E21D 11/00
[52] U.S. Cl. ...................... 405/151; 405/154; 138/146; 138/157
[58] Field of Search ...................... 405/154, 150.1, 405/151, 152, 153; 138/98, 146, 155, 157

[56] References Cited

U.S. PATENT DOCUMENTS

| 1,683,025 | 9/1928 | Dallam | 405/153 |
| 2,015,102 | 9/1935 | Doig | 405/150.1 |
| 2,583,316 | 1/1952 | Bannister . | |
| 2,887,231 | 5/1959 | Schodorf, Sr. . | |
| 3,415,063 | 12/1968 | Akita et al. | 405/153 |
| 3,424,487 | 1/1969 | Pector et al. . | |
| 3,939,780 | 2/1976 | Bundy . | |
| 4,009,063 | 2/1977 | Wood | 405/146 X |
| 4,018,054 | 4/1977 | Standley | 405/152 |
| 4,124,985 | 11/1978 | Mainets | 405/150.1 |
| 4,188,168 | 2/1980 | Brown et al. . | |
| 4,323,599 | 4/1982 | Marshall | 427/181 |
| 4,347,018 | 8/1982 | Wrightson et al. | 405/150.1 |
| 4,361,451 | 11/1982 | Renaud | 156/294 X |
| 4,371,288 | 2/1983 | Borca et al. | 405/150.1 X |
| 4,404,328 | 9/1983 | Dawans et al. | 525/274 |
| 4,497,590 | 2/1985 | Chase | 405/153 X |
| 4,527,826 | 7/1985 | O'Neal . | |
| 4,693,635 | 9/1987 | Matiere | 138/155 |
| 4,863,311 | 9/1989 | Pirk et al. | 405/128 |
| 4,897,135 | 1/1990 | Aylor et al. | 138/97 X |
| 4,915,542 | 4/1990 | Fernando | 405/150.1 |
| 5,119,862 | 6/1992 | Mainets et al. | 405/150.1 X |
| 5,304,236 | 4/1994 | Fears | 106/15.5 |
| 5,344,531 | 9/1994 | Saito et al. | 204/147 |

(List continued on next page.)

FOREIGN PATENT DOCUMENTS

| 0130561 | 1/1985 | European Pat. Off. . | |
| 130561A | 1/1985 | European Pat. Off. . | |
| 0562441 | 9/1993 | European Pat. Off. . | |
| 562441A | 9/1993 | European Pat. Off. . | |
| 88558 | 1/1995 | Germany . | |
| 88558C | 1/1995 | Germany . | |
| 55-500623 | 4/1980 | Japan . | |
| 404198597 | 7/1992 | Japan | 405/153 |
| 08027828 | 1/1996 | Japan . | |
| 9002377 | 6/1992 | Netherlands . | |

(List continued on next page.)

*Primary Examiner*—Eileen D. Lillis
*Assistant Examiner*—John Kreck

[57] ABSTRACT

A wall surface of a structure to be rendered antifouling is covered with antifouling panels caused to firmly adhere thereto and fixed. Not only can this work be conducted easily and quickly but also part of the antifouling panels can be easily replaced. The disclosed antifouling wall structure and method of constructing the antifouling wall are characterized in that antifouling panels each comprising a base material layer and, formed thereon, an antifouling paint layer are arranged on a wall surface of structure to be rendered antifouling so that the antifouling panels have their side of antifouling paint layer brought into contact with water and detachably fixed by means of fastening members.

7 Claims, 21 Drawing Sheets

U.S. PATENT DOCUMENTS

| | | | |
|---|---|---|---|
| 5,358,749 | 10/1994 | Fears | 427/397.7 |
| 5,380,128 | 1/1995 | Fears | 405/157 |
| 5,411,360 | 5/1995 | Hilliker et al. | |
| 5,439,319 | 8/1995 | Flanagan et al. | 405/152 |
| 5,556,676 | 9/1996 | Fukumoto | 405/150.1 X |
| 5,608,998 | 3/1997 | Hume | 405/150.1 X |

FOREIGN PATENT DOCUMENTS

| | | | |
|---|---|---|---|
| 873248 | 7/1961 | United Kingdom | 405/153 |
| 2198395 | 6/1988 | United Kingdom . | |
| 2274699 | 8/1994 | United Kingdom . | |
| 2288835 | 11/1995 | United Kingdom . | |
| WO8000554 | 4/1980 | WIPO . | |
| WO800554A | 4/1980 | WIPO . | |

ANTIFOULING WALL STRUCTURE FOR USE IN PIPE AND METHOD OF CONSTRUCTING THE ANTIFOULING WALL THEREFOR

This application is a divisional of application Ser. No. 08/758,820, filed Dec. 4, 1996, U.S. Pat. No. 5,885,029 and claims priority to Japanese Application Nos. 315583/1995, filed Dec. 4, 1995, 213819/1996, filed Aug. 13, 1996 and 213820/1996 filed Aug. 13, 1996.

FIELD OF THE INVENTION

The present invention relates to an antifouling wall structure and a method of constructing an antifouling wall. more particularly, the present invention is concerned with an antifouling wall structure in which antifouling panels for preventing the attachment of organism living in the seawater or fresh water each comprising a base material such as steel, concrete, plastic or synthetic rubber and, laminated thereto, a pollution-free silicone-based antifouling paint layer are detachably fixed on a wall surface of structure to be rendered antifouling so that the antifouling panels have their side of antifouling paint layer brought into contact with water, Further, the present invention is concerned with a method of constructing this antifouling wall.

Moreover, the present invention relates to an antifouling wall structure for use in pipe structures and a method of constructing the antifouling wall. More particularly, the present invention is concerned with an antifouling wall structure capable of preventing the attachment of oceanic life such as shellfish or seaweed to, for example, an inner wall surface of pipe structure of concrete, steel plates, etc. constructed in the seawater and is also concerned with a method of constructing this antifouling wall.

Furthermore, the present invention relates to an antifouling wall panel transporter suitable for use in the long-term safekeeping and carriage of antifouling wall panels for preventing the attachment of organism living in the seawater or fresh water each comprising a base material such as steel, concrete, plastic or synthetic rubber and, applied thereto, a pollution-free silicone-based antifouling paint layer.

DESCRIPTION OF THE PRIOR ART

A large variety of vegetoanimal organisms having attaching properties such as barnacle, Serpula, blue mussel, oyster, *Bugula neritina*, sea-squirt, Enteromorpha and sea lettuce live in the sea. when oceanic life attaches to and grows on the water contacting surface of submarine installations such as cooling water intake channels of thermal and nuclear power stations and other seaside plants, port facilities, submarine pipelines, submarine oil field excavating rigs, navigational buoys and ship mooring buoys, various damages are encountered. For example, in cooling water intake channels of power stations, the attachment and growth of the above submarine organisms increase the stream flow resistance of cooling seawater, so that the performance of heat exchangers is deteriorated to adversely affect the efficiency of power generation. Further, in navigational and mooring buoys, the attachment and growth of the above submarine organisms invite the danger of collapse or sinking. Still further, in port facilities, submarine pipelines and oil field excavating rigs, the attachment and growth of the above submarine organisms accelerate the corrosion of structural base material to thereby shorten the endurance life of the structural base material.

For preventing or suppressing these damages, measures have been implemented for long in which the water contacting surfaces of submarine structures are coated with various types of antifouling paints and antifouling agents dissolve into the seawater from the coating films to thereby prevent or suppress the attachment and growth of organisms.

However, the antifouling paint is to be applied by repeating coating, for example, at least effecting undercoating, intermediate coating and top coating, so that the application of the antifouling paint takes at least several days. When the period allowed for the application of the antifouling paint is short, it may occur that the applied coating is not satisfactory. In addition, there are occasions such that the application of the antifouling paint must be conducted within a short period between tidal ebb and flow or while the structure is immersed in the seawater.

For example, in cooling water intake pipes of power stations, it has been a common practice to previously apply various types of antifouling paints to inner wall surfaces of pipe structure and, according to necessity, temporarily discontinue the intake of cooling water to thereby enable livers to remove attaching oceanic life.

However, since the amount of oceanic life which adhere to the structure is too large, the direct removal by divers must be conducted a multiplicity of times. Thus, the removal by divers is not a satisfactory solution. Further, cooling water intake pipes are generally located 6 to 10 m below the surface of the water, so that dry atmosphere cannot be realized to thereby cause the application of antifouling paint to be extremely difficult.

Published Japanese Translation of PCT Patent Application from other states, No. 55(1980)-500623 ("Prevention of fouling of marine structures") disclosed a method of constructing an antifouling wall. However, it is difficult to apply this method to cooling water intake channels and drain channels. Further, although panel fixing by means of an adhesive can be contemplated, this method has a problem in panel detachment to thereby encounter the drawback that shortening of the work period is infeasible.

Therefore, there is a demand for the development of an antifouling wall structure and a method of constructing an antifouling wall which enable applying antifouling coating to a water contacting surface of structures within a shortened work period.

Japanese Patent Laid-open Publication No. 8(1996)-27828 proposed the prevention of attachment of marine products to concrete structures constructed in seawater atmosphere with the use of antifouling paints in which guide frames were mounted on a seawater contacting surface of object concrete structure and panels coated with an antifouling paint were arranged by means of the guide frames.

However, in the above invention of Japanese Patent Laid-open Publication No. 8(1996)-27828, two edges of each of the panels must be inserted in guide frame shoulder parts and pulled into specified positions at the time of supporting and fixing the panels by means of the guide frames. Thus, not only can the fitting of the panels be made only after the mounting of all the guide frames but also replacement of part of the panels would require temporarily removing all the panels.

Furthermore, for closely contacting the panels with the wall surface of the structure to be rendered antifouling and securely fixing them, it is required to make perforations at inner parts of the panels, put bolts or the like through the perforations and screw the bolts or the like. That is, unless fixing parts are not provided at inner parts of the panels, the panels would be unable to follow the irregularity of the wall surface to thereby suffer from the formation of a difference in level, from which seawater flows in with the result that not only would the panels vibrate but also the attachment and growth of organism would not be prevented. Thus, not only would positioning of the setting location of the guide frames have to be appreciably accurate but also difficult work such as panel perforation with high precision would separately be required. Further, the alignment between perforations made in the panels and anchor bolts would be pretty difficult. As a consequence, the panel fitting would be delayed.

On the other hand, for these types of antifouling wall panels, it is desired to efficiently carry out the safekeeping, transportation, carriage to work site and mounting thereof without injuring the panel surface so that the costing film performance can be maintained.

Long-term safekeeping of the above antifouling wall panels has commonly been conducted by piling them one upon another with curing sheets interposed therebetween on a pallet of plate form commonly employed for carriage. Further, the antifouling wall panels have been transported in that state.

However, when antifouling panels are piled one upon another and the safekeeping and carriage thereof are conducted on the pallet for carriage as have conventionally been practiced, the weight of, for example, 20 antifouling wall panels is as large as 1.5 t, so that there have been the problems that not only occasionally does the load of the weight damage the precious coating films of the antifouling wall panels during the in carriage, out carriage or takeout at site but also the treatment of the curing sheets is pretty time-consuming.

The present invention has been made with a view toward solving the above drawbacks of the prior art, and an object of the present invention is to provide an antifouling wall structure and a method of constructing an antifouling wall which enable shortening the work period required for applying antifouling coating to the water contacting surface of a structure to be rendered antifouling.

Another object of the present invention is to provide an antifouling wall structure and a method of constructing an antifouling wall which enable covering the wall surface of a structure to be rendered antifouling with antifouling panels caused to firmly adhere to the wall surface and fixed thereon and further enable not only easily and quickly performing this covering but also easily replacing part of the panels.

A further object of the present invention is to provide an antifouling wall structure for pipe structures and a method of constructing an antifouling wall which enable effectively preventing oceanic life such as shellfish from attaching to and growing on pipe structures constructed underwater in the sea.

Still a further object of the present invention is to provide an antifouling wall panel transporter which enables not only efficiently performing the long-term safekeeping and carriage of antifouling wall panels without injuring precious coating films but also safely taking out one by one while ensuring protection of the coating films at the work site to thereby enable application of the antifouling panels to the wall surface.

SUMMARY OF THE INVENTION

The antifouling wall structure of the present invention comprises a wall structure to be rendered antifouling having a water contacting surface, at predetermined positions of which a plurality of first fastening members are plunged, and, superimposed on the wall structure, antifouling panels each comprising a base material layer and, formed thereon, an antifouling paint layer, the antifouling panels having engagement holes formed at positions corresponding to the positions of the first fastening members, the antifouling panels being arranged so as to have their side of antifouling paint layer brought into contact with water and detachably fixed on the wall structure to be rendered antifouling by engaging second fastening members with the first fastening members through the engagement holes.

The method of constructing an antifouling wall according to the present invention comprises the steps of:

providing a wall structure to be rendered antifouling having a water contacting surface, at predetermined positions of which a plurality of first fastening members are plunged;

arranging thereon antifouling panels each comprising a base material layer and, formed thereon, an antifouling paint layer, the antifouling panels having engagement holes formed at positions corresponding to the positions of the first fastening members, so that the antifouling panels have their side of antifouling paint layer brought into contact with water; and detachably fixing the antifouling panels on the wall structure to be rendered antifouling by engaging second fastening members with the first fastening members through the engagement holes.

Further, the antifouling wall structure of the present invention comprises a wall structure to be rendered antifouling and, arranged on a surface of the wall structure, antifouling panels each having the form of a rectangular plate and comprising a base material and, superimposed thereon, an antifouling paint layer, both horizontal edges of the antifouling panels being held between the wall structure to be rendered antifouling and a horizontally extending fixing joint plate having the form of a lengthy plate while right and left edges of the antifouling panels being detachably fixed by means of lateral direction fixtures in such a fashion that the right and left edges are arranged in mutually abutting relationship and the lateral direction fixtures are positioned and driven at the abutting portions.

In this structure of the present invention, the four sides of each antifouling panel having the form of a rectangular plate can be securely caused to adhere to and fixed on the wall surface of a structure to be rendered antifouling without perforating inner parts of the antifouling panel, that is, both horizontal sides can be caused to adhere to and fixed on the wall surface by means of fixing joint plates and right and left ends by lateral direction fixtures. Thus, the wall surface of the structure to be rendered antifouling can be covered with antifouling panels.

The above-mentioned wall structure to be rendered antifouling is, for example, a wall of a cooling water intake channel or drain channel of power stations. It is preferred that the antifouling paint layer of the antifouling panel be composed of a silicone-based antifouling paint.

Each of the lateral direction fixtures may comprise a nut anchor plunged in the wall structure to be rendered antifouling and a bolt. Still further, semicircular dents can be provided at the right and left edges of the antifouling panels so that, when the right and left edges are abutted with each other, circular holes are formed, in which the nut anchors are positioned.

Further, the method of constructing an antifouling wall according to the present invention comprises the steps of:

horizontally fitting at least two rows of fixing joint plates each having the form of a lengthwise extending plate in mutually parallel relationship on a surface of a wall structure to be rendered antifouling by means of joint plate fixtures in such a way that the joint plate fixtures are loosened, inserting one edge of each of antifouling panels each having the form of a rectangular plate and comprising a base material and, superimposed thereon, an antifouling paint layer between the wall structure to be rendered antifouling and one fixing joint plate and thereafter inserting the opposite edge of each of the antifouling panels between the wall structure to be rendered antifouling and a fixing joint plate neighboring to the one fixing joint plate to thereby temporarily clamp the antifouling panels, working the joint plate fixtures while bringing the right and left edges of the antifouling panels into mutually abutting relationship and fastening the abutting portions of the antifouling panels by means of lateral direction fixtures.

In this constitution of the present invention, the antifouling panels can easily and quickly be caused to adhere to and fixed on the wall surface of the structure to be rendered antifouling by arranging the fixing joint plates, temporarily clamping the antifouling panels between mutually neighboring fixing joint plates to thereby prevent fall thereof and thereafter fastening the antifouling panels by means of the joint plate fixtures and the lateral direction fixtures.

In this method, each of the lateral direction fixtures may comprise a nut anchor and a bolt. Further, semicircular dents can be provided at the right and left edges of the antifouling panels so that, when the right and left edges are abutted with each other, circular holes can be formed, in which the nut anchors are tapped, followed by screwing the bolts in the nut anchors to thereby fasten the antifouling panels. Moreover, each of the joint plate fixtures may comprise an anchor bolt plunged in the wall structure to be rendered antifouling and a nut.

Furthermore, the antifouling wall structure for use in pipe-structures through which fluid such as seawater flows according to the present invention comprises a pipe wall structure to be rendered antifouling and, detachably fitted on an inner wall surface thereof, antifouling panels consisting of a plurality of divisions made from synthetic resins.

In this antifouling wall structure, it is preferred that the antifouling panel divisions consist of first divisions arranged on ceiling parts of the pipe structure, second divisions arranged on one side of the first divisions and third divisions arranged on the opposite side of the first divisions.

It is also preferred that the second divisions and the third divisions have respective edges lying in mutually abutting relationship and the abutting portions be detachably fixed by means of a plate lock extending along the flow of the fluid.

The method of constructing an antifouling wall on an inner wall surface of pipe structure according to the present invention includes detachably fitting antifouling panels each consisting of three synthetic resin divisions on an inner wall surface of pipe structure, which method comprises the steps of:

causing one division to be arranged on a ceiling part of the pipe structure to float underwater by means of an air bag so that the division is pressed against the ceiling part, holding two other divisions on both sides of the division pressed against the ceiling part, inserting an extender jig capable of regulating spacing in a junction of the two other divisions to thereby press the two other divisions against the inner wall surface of the pipe structure, replacing the extender jig by a baffle so that the two other divisions can have a spacing therebetween held constant at the junction, and detachably fixing the junction of the two other divisions having the baffle inserted therein by means of a plate lock extending along a flow of fluid effected through the pipe structure.

In this constitution of the present invention, each antifouling panel consists of divisions, so that not only is the carriage thereof into the seawater easy but also the antifouling wall can be constructed on the inner wall surface of already constructed pipe structures.

When the antifouling panel divisions consist of first divisions arranged on ceiling parts and second and third divisions arranged on both sides of the first divisions, the panels can be constructed by a reduced number of steps. The first divisions arranged on ceiling parts can be floated up, so that, in that state, fitting of the other divisions can be efficiently conducted.

The junction of two divisions is detachably fixed by means of the plate lock, so that the divisions can easily be assembled or disassembled with the spacing therebetween held constant.

In this method, the work efficiency underwater is so high that the panels consisting of divisions can easily and securely be fixed on the inner wall surface of the structure to be rendered antifouling.

The antifouling wall panel transporter of the present invention comprises a rectangular frame consisting of longitudinal frame members and lateral frame members, a pillar stood in a center of the longitudinal frame members and support plates of predetermined lengths which are arranged on both sides of the pillar and have a downward inclination toward the pillar, said support plates having upper surfaces provided with recesses at specified pitches along the lengths of the support plates.

This structure of the present invention enables standing antifouling wall panels inclined inward against the pillar in the state of having the lower edge of each antifouling wall panel positioned in the recess formed on the upper surface of the support plate. Thus, a plurality of antifouling wall panels can be kept safe and transported with specified spacings therebetween.

The whole of the transporter can be craned by holding a cross beam on an upper end of the pillar, securing a lifting hook to an upper surface of the cross beam and causing a crane to catch the lifting hook.

Support stands adapted to have wheels secured thereto can be arranged on the backs of four corners of the frame. Securing wheels to the support stands enables facilitating the carriage of the transporter. Also, providing the support stands enables inserting the fork of a forklift into the space made under the frame.

The other form of antifouling wall panel transporter according to the present invention comprises a pair of supports each having a ⊃-shaped cross section connected with each other by holding means and respective movable plates movably fitted inside the supports so that an antifouling wall panel is held between the movable plates and the supports.

In the present invention of the above constitution, one by one can be taken out from the antifouling wall panels arranged in the state of standing against the pillar with specified spacings held therebetween as mentioned above by inserting the supports into the interstice between mutually neighboring antifouling wall panels, holding the relevant antifouling wall panel between the support and the movable plate and grasping the holding means. In this state, the antifouling wall panel can easily be applied to the wall surface to be rendered antifouling.

The above holding means may be composed of either holders secured to the supports or string members which are connectable by means of a coupler.

DETAILED DESCRIPTION OF THE PREFERRED EMBODIMENTS

The antifouling wall structure and the method of constructing an antifouling wall according to the present invention will be described in greater detail below with reference to the drawings.

Figure 1:
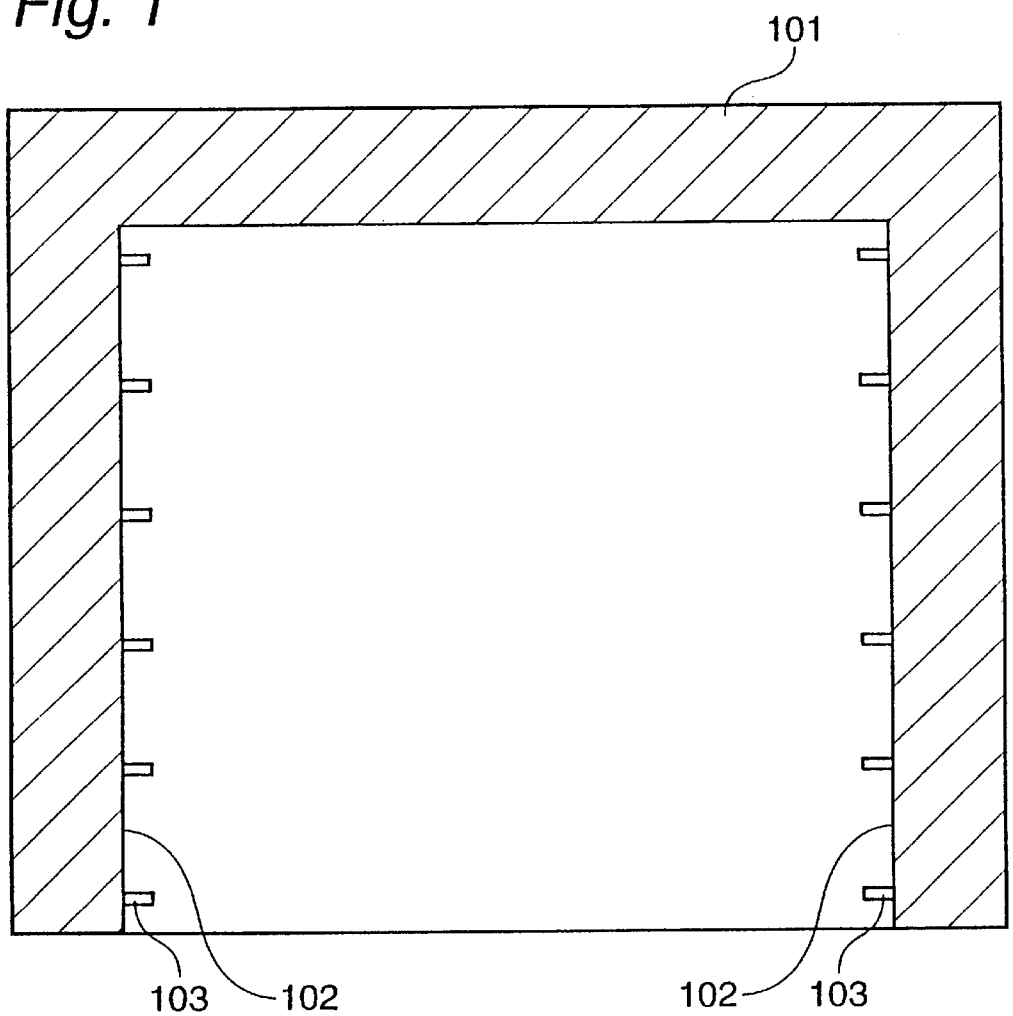
FIG. 1 is a longitudinal section of a wall structure to be rendered antifouling of a cooling water intake channel or drain channel used in thermal and nuclear power stations.
Figure 2:
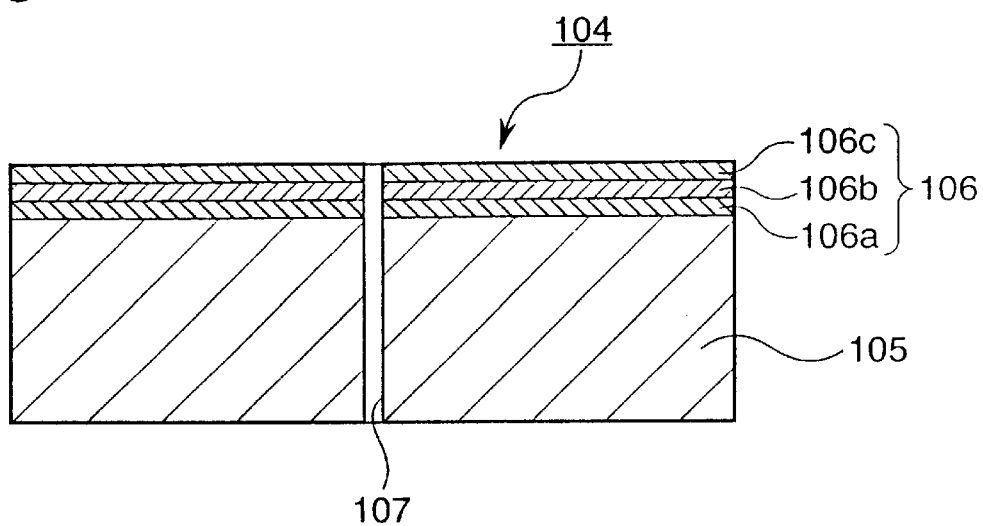
FIG. 2 is a sectional view explaining the structure of the antifouling panel used in the present invention.
Figure 3:
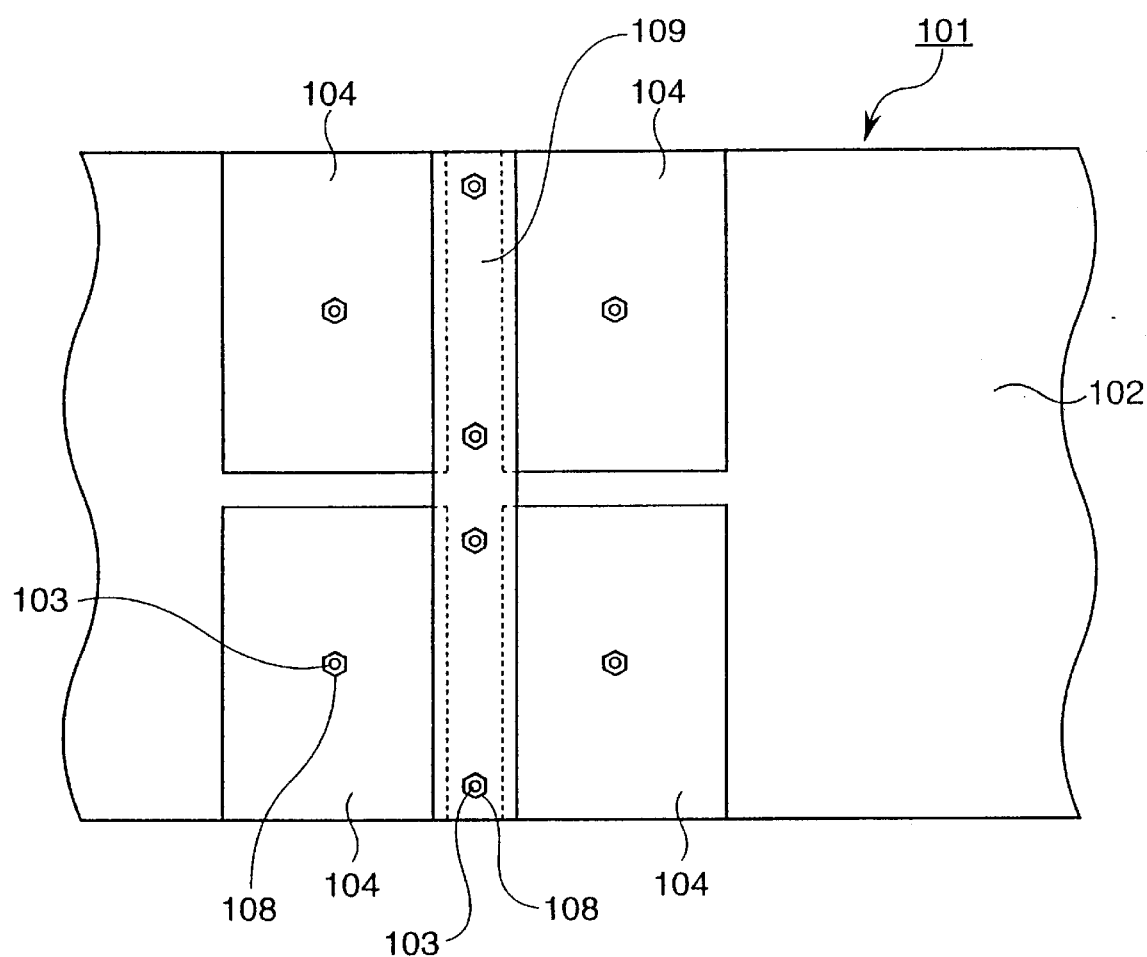
FIG. 3 is a view explaining one mode of detachably fixing the antifouling panels on the water contacting surface of a wall to be rendered antifouling.

FIG. 1 is a longitudinal section of a structure to be provided with an antifouling wall, which constitutes part of a cooling water intake channel or drain channel for use in thermal and nuclear power stations. FIG. 2 is a sectional view given for explaining the structure of an antifouling panel for use in the present invention. FIG. 3 is a view given for explaining one mode of the method of detachably fixing the antifouling panel on a water contacting surface of the structure to be provided with an antifouling wall.

The antifouling wall structure of the present invention comprises a structure to be rendered antifouling 101 having a water contacting surface 102, at predetermined positions of which a plurality of first fastening members 103 such as steel bolts are plunged. Furthermore, antifouling panels 104 having engagement holes 107 formed at positions corresponding to those of the first fastening members 103 are detachably fixed on the surface 102 of the structure to be rendered antifouling 101 by engaging second fastening members 108, such as steel nuts with the first fastening member 103, through the engagement holes 107, In the meantime, the antifouling panels 104 comprise a base material layer 105 and an antifouling paint layer 106 formed thereon and the panels 104 are detachably fixed on the structure to be rendered antifouling 101 in the state that their side of antifouling paint layer 106 are brought into contact with water.

The method of constructing an antifouling wall according to the present invention comprises the steps of:

providing a structure to be rendered antifouling 101 having a water contacting surface 102, at predetermined positions of which a plurality of first fastening members 103 such as steel bolts are plunged;

arranging thereon antifouling panels 104 each comprising a base material layer 105 and, formed thereon, an antifouling paint layer 106, the antifouling panels 104 having engagement holes 107 formed at positions corresponding to those of the first fastening members 103, so that the antifouling panel 104 has its side of antifouling paint layer 106 brought into contact with water; and detachably fixing the antifouling panel 104 on the structure to be rendered antifouling 101 by engaging second fastening members 108 such as steel nuts with the first fastening members 103 through the engagement holes 107.

In the detachable fixing of a plurality of antifouling panels 104 on the water contacting surface 102 of the structure to be rendered antifouling 101, for example, one antifouling panel 104 is so set that, as shown in FIG. 3, a steel bolt 103 plunged at predetermined position of the water contacting surface 102 of the structure to be rendered antifouling 101 so as to project therefrom passes through the engagement hole 107 of the antifouling panel 104 and projects from the surface of the antifouling panel 104. Then, the so set antifouling panel 104 is detachably fixed with the use of a steel nut 108, Subsequently, another antifouling panel 104 is disposed at a predetermined spacing from an edge of the above antifouling panel 104 in abutting relationship on the water contacting surface 102 of the structure to be rendered antifouling 101. The other antifouling panel 104 is detachably fixed in the same manner as in the former antifouling panel 104.

The structure to be rendered antifouling 101 has a plurality of steel bolts 103 plunged between the above fixed two antifouling panels 104 so as to project from the water contacting surface 102 of the structure to be rendered antifouling 101. A joint patch plate 109 having engagement holes (not shown) formed at positions corresponding to those of these bolts 103 is arranged so as to cover end surfaces of the above two antifouling panels 104 with the above bolts 103 passing through the engagement holes and detachably fixed with steel nuts 108. It is preferred that the surface of the joint patch plate 109 be coated with an antifouling paint layer as is for the antifouling panel 104. Also, it is preferred that the surfaces of the first fastening members 103 such as steel bolts and second fastening members 108 such as steel nuts as well be treated with antifouling paints.

The entirety of the water contacting surface 102 of the structure to be rendered antifouling 101 is covered with the antifouling panels 104 and joint patch plates 109 by repeating these operations.

Examples of the structures to be rendered antifouling 101 in the present invention include cooling water intake channels and drain channels installed in thermal and nuclear power stations and other seaside plants, port facilities, structures installed in the sea such as submarine pipelines, submarine oil field excavating rigs, navigational buoys and ship mooring buoys and structures installed in fresh water.

The antifouling panel 104 for use in the present invention comprises a base material layer 105 and, formed thereon, an antifouling paint layer 106 as shown in FIG. 2 and has an engagement hole 107 formed at predetermined position.

The base material layer 105 forming part of the antifouling panel 104 is composed of, for example, a metal, a concrete, a hard or soft plastic or a hard or soft rubber, Examples of the above metals include carbon steel, aluminum, stainless steel and copper alloys. Of these, carbon steel is preferred from the viewpoint that the cost is low. With respect to the configuration, it can be used in the form of, for example, a plate, a pipe or a half split pipe. The metal in the form of a plate is generally applied to flat parts of the structure and the metal in the form of a pipe or a half split pipe is applied to a columnar or cylindrical structure. For a two- or three-dimensionally curved structure, the metal plate shaped into the curved form can be employed.

Examples of the above concretes include concrete plates obtained by mixing together portland cement, fine and coarse aggregates such as sand and gravel and water, optionally followed by incorporation of reinforcing bars according to necessity, and shaping the concrete mixture in the same manner as used in the general engineering and construction work. A portland blast-furnace slag cement, white cement or readily hardenable cement may be substituted for the above portland cement. As the aggregate, use can be made of a lightweight aggregate, for example, lightweight concrete obtained by mixing together pumice, vermiculite and pearlite burning products. With respect to the configuration, as in the above metal, it can be shaped in advance into the form of a pipe or a half split pipe or the form corresponding to that of the structure.

Examples of the above plastics include hard plates of, for example, polyvinyl chloride, polyolefins (such as polyethylene and polypropylene), methyl methacrylate, polycarbonate, FRP (glass-fiber-reinforced plastic) and CRP (carbon-fiber-reinforced plastic) and films of, for example, polyvinyl chloride, polyolefins and polyvinylidene chloride. With respect to the configuration of the hard plates, as in the above metal and concrete, they can be shaped in advance into the form of a pipe or a half split pipe or the form corresponding to that of the structure.

Examples of the above rubbers include plates and films of hard and soft natural rubbers produced by vulcanization and plates and films of hard and soft synthetic rubbers produced by vulcanization. The above rubbers also include hard and soft rubber-lined materials obtained by applying an unvulcanized rubber solution onto the surface of a metal base and effecting vulcanization thereof by heating or with the use of a chemical at ordinary temperature.

The above antifouling paint layer 106 is generally formed by sequentially applying an undercoating composition, an intermediate coating composition and an antifouling top coating composition onto the surface of the above base material layer 105.

Suitable examples of the above undercoating compositions include:

polyolefin resin primers such as PE Primer (trade name, produced by Chugoku Marine Paints, Ltd.);

vinyl resin primers such as FRP Primer (trade name, produced by Chugoku Marine Paints, Ltd.);

vinyl resin undercoating paints such as Vinyl AC-HB (trade name, produced by Chugoku Marine Paints, Ltd.);

epoxy resin undercoating paints such as EPICON HB-AL (trade name, produced by Chugoku Marine Paints, Ltd.), EPICON C-100 (trade name, produced by Chugoku Marine Paints, Ltd.), EPICON A-100 (trade name, produced by Chugoku Marine Paints, Ltd.) and EPICON S-100 (trade name, produced by Chugoku Marine Paints, Ltd.);

tar epoxy resin undercoating paints such as BISCON AC-HB (trade name, produced by Chugoku Marine Paints, Ltd.); and tar vinyl resin undercoating paints such as Silvax SQ-BC (trade name, produced by Chugoku Marine Paints, Ltd.).

The coating film 106a formed by applying the above undercoating composition onto the surface of the base material layer 105 enables not only ensuring the adherence between the base material layer 105 and the coating film 106b of intermediate coating composition formed on the coating film 106a of undercoating composition but also imparting anti corrosive properties when the base material is made of steel and capability of preventing coating film deterioration caused by alkali contents when the base material is made of concrete.

Suitable examples of the above intermediate coating compositions include:

vinyl resin intermediate coating paints such as Vinyl AC-HB Binder (trade name, produced by Chugoku Marine Paints, Ltd.) and epoxy resin intermediate coating paints such as EPICON HB-AL Binder (trade name, produced by Chugoku Marine Paints, Ltd.).

The coating film 106b formed by applying the above intermediate coating composition onto the surface of the coating film 106a of undercoating composition enables ensuring the adherence between the coating film 106a of undercoating composition and the coating film 106c of antifouling top coating composition.

Examples of the above antifouling top coating compositions include nontoxic antifouling coating compositions comprising (a) a reaction-curable (or -unvlucanizable) silicone rubber, especially, room-temperature-vulcanizable silicone rubber (RTV) as vehicle and (b) a water-repellent organic compound which does not react with this reaction-curable silicone rubber and exhibits high compatibility and dispersibility therein, optionally along with (c) a hydrolyzable silyl group containing acryl copolymer resin added according to necessity.

The above reaction-curable silicone rubber (a) comprises an organopolysiloxane having siloxane bonds which is cured by chemical reaction as a principal component. This organopolysiloxane is one comprising Si and a functional group capable of curing reaction such as a hydroxyl or alkoxyl group and an organic group such as a methyl, phenyl or vinyl group, wherein the functional group and the organic group are directly bonded to Si. A polyfunctional silane compound having a hydrolyzable group bonded thereto (for example, acetoxy, methoxy, ketoxime, ethoxy or amide group) can be employed as a crosslinking agent, and an organic acid salt of metal (e.g., naphthenate or octylate of lead, iron, cobalt, manganese or zinc), peroxide or organic amine can be optionally employed as a curing catalyst. At least one of them may be added to the organopolysiloxane to obtain a one-package or two-package silicone rubber. The resultant mixture is cured through hydrolysis, or alcohol, acetic acid, oxime or hydroxylamine eliminating reaction, etc. at room temperature or raised temperatures. Silicone rubber which is of the one package type and curable at room temperature is preferred from the viewpoint that the application can be easily conducted, and one whose curing is accompanied by by-products of less irritation is still preferred.

In particular, use can be made of commercially available silicone rubbers KE40RTV, KE48, KE42S, KE45, KE45TS, KE445 and KE348 (trade names, all produced by Shin-Etsu Chemical Co., Ltd.).

Examples of the above water-repellent organic compounds (b) include silicone oil, mineral oil, petroleum wax, plasticizers, fatty oil and fluoro oil, which can be used without exception as long as they are in the form of a liquid or grease at room temperature. Of these, silicone oil is especially preferred. In particular, use can be made of methylsilicone oil, methylphenylsilicone oil and polyether modified silicone oil either individually or in combination.

Commercially available products equivalent to the above silicone oils include KF-96, KF-92 and KF-69 (methylsilicone oils), KF-50, KF-53, KF-54 and KF-56 (methylphenylsilicone oils) and KF-351 and KF-353 (polyether modified silicone oils) (trade names, all produced by Shin-Etsu Chemical Co., Ltd.).

The proportion at which the above water-repellent organic compound is blended with the reaction-curable silicone rubber ranges from 1 to 50% by weight, preferably, from 5 to 35% by weight based on the reaction-curable silicone rubber solid. When the blending proportion is less than 1% by weight, the antifouling properties are deteriorated. on the other hand, when the blending proportion exceeds 50% by weight, the curability of coating film is poor, so that highly durable coating film cannot be obtained.

Although a wide variety of conventional copolymers can be used as the above hydrolyzable silyl group containing acryl copolymer resin (c) optionally added according to necessity, it is preferred that use be made of a hydrolyzable silyL group containing copolymer obtained by reacting a ailane compound having an acetoxy, ketoxime or alkoxy group as a hydrolyzable group with copolymer [I] of:

(i) an alkyl (meth)acrylate and (ii) at least one monomer selected from the group consisting of (meth)acrylic acid and hydroxylated lower alkyl (meth)acrylates.

The above copolymer [I] may also be a copolymer of:

(i)-(1) an alkyl (meth)acrylate, (i)-(2) a vinyl compound selected from the group consisting of vinyl acetate, vinyl chloride, vinyl methyl ether, vinyl ethyl ether and vinylpyrrolidone, and (ii) at least one monomer selected from the group consisting of (meth)acrylic acid and hydroxylated lower alkyl (meth)acrylates.

Examples of the alkyl (meth)acrylates include methyl, ethyl, propyl, butyl and octyl acrylates (these alkyl groups may be linear or branched) and methacrylic compounds corresponding thereto such as methyl methacrylate.

Examples of the vinyl compounds include vinyl acetate, vinyl chloride, vinyl methyl ether, vinyl ethyl ether and vinylpyrrolidone.

Examples of the hydroxylated lower alkyl (meth)acrylates include 2-hydroxyethyl and 2-hydroxypropyl (meth) acrylates.

Examples of the silane compounds having an acetoxy, ketoxime or alkoxy group as a hydrolyzable group include methyltriacetoxysilane, vinyltriacetoxysilane, ethyltriacetoxysilane, tris(ethylmethylketoxime) methylsilane, tris(ethylmethylketoxime)vinylailane, vinyltrimethoxysilane, ethyltrimethoxysilane, hexyltrimethoxysilane, phenyltrimethoxysilane, methyltriethoxysilane, vinyltriethoxysilane, ethyltriethoxysilane, propyltriethoxysilane, phenyltriethoxysilane, methyltripropoxysilane and methyltriisopropoxysilane.

The hydrolyzable silyl group containing acrylic copolymer resin (c) can be obtained by reacting the silane compound having an acetoxy, ketoxime or alkoxy group as a hydrolyzable group with the copolymer [I] obtained by radical polymerization of (i) at least one monomer selected from the group consisting of alkyl (meth)acrylates and vinyl compounds and (ii) at least one monomer selected from the group consisting of (meth)acrylic acid and lower alkyl (meth)acrylates in the presence of an organic solvent.

In this reaction, it is believed that the silane compound having a hydrolyzable group would react with the active group (carboxyl group when the employed compound (ii) is (meth)acrylic acid or hydroxyl group when the employed compound (ii) is a hydroxylated lower alkyl (meth)acrylate) of the copolymer [I].

It is preferred that the amounts of alkyl (meth)acrylate monomer (i), at least one monomer (ii) selected from the group consisting of (meth)acrylic acid and hydroxylated lower alkyl (meth)acrylates and silane compound having a hydrolyzable group all of which are used for producing the copolymer [I] be determined taking into account the surface orientation balance of hydroxyl groups after hydrolysis of the obtained hydrolyzable silyl group containing acrylic copolymer and hydrophobic methyl groups of the blended reaction-curable silicone rubber.

Generally, the amount of (meth)acrylic acid or hydroxylated lower alkyl (meth)acrylate (ii) is preferred to range from 1 to 30% by weight, preferably, from 2 to 20% by weight based on the copolymer [I].

Further, it is preferred that the silane compound having a hydrolyzable group be used in an amount at least equimolar to that of the (meth)acrylic acid or hydroxylated lower alkyl (meth)acrylate (ii) per the copolymer [I].

When the amount of (meth)acrylic acid or hydroxylated lower alkyl (meth)acrylate (ii) used falls outside the range of 1 to 30% by weight, the surface orientation balance of hydroxyl groups after hydrolysis of the obtained hydrolyzable silyl group containing acrylic copolymer and hydrophobic methyl groups of the silicone rubber is not appropriate, so that the hydrolyzable silyl group containing acrylic copolymer must be blended in excess of the silicone rubber, then it would occur that the water repellency of the surface is poor and the antifouling properties thereof are deteriorated.

The above hydrolyzable silyl group containing acrylic copolymer resin (c) is preferred to have a number average molecular weight ranging from 3000 to 30,000. When the number average molecular weight is less than 3000, satisfactory coating film strength cannot be obtained. On the other hand, when the number average molecular weight exceeds 30,000, the compatibility thereof with the silicone rubber is poor.

The proportion at which the hydrolyzable silyl group containing acrylic copolymer resin (c) is blended with the silicone rubber is preferred to range from 0.1 to 35% by weight, especially, from 1 to 20% by weight based on silicone rubber solid. When the proportion fall outside the range of 0.1 to 35% by weight, the antifouling properties are deteriorated.

This nontoxic antifouling coating composition can be loaded with a body pigment, a color pigment, an antisagging agent, an antifouling agent, an organic solvent, etc. as used in the customary antifouling paint producing art according to necessity.

Other examples of the antifouling top coating compositions are an antifouling coating composition containing an antifouling agent of cuprous oxide, conventional nonstannic antifouling agent containing antifouling coating composition and stannic antifouling agent containing antifouling coating composition. Of the antifouling coating compositions, the above described nontoxic antifouling coating composition is especially preferred in the present invention.

The undercoating, intermediate coating and antifouling top coating compositions are not limited to those mentioned above, and commercially available compositions can be used as long as similar performance is exhibited.

The undercoating, intermediate coating and antifouling top coating compositions are sequentially applied onto a prearranged surface of the base material layer in the respective steps by brushing or spraying. In each of the application steps, coating film drying is conducted at room temperature. When the time is limited, forced drying may be effected in undercoating and intermediate coating by heating at temperatures suitable for the respective coating films for given periods of time.

In the prearrangement of the surface of the base material layer composed of each of plastics and rubbers, the surface is roughened by an abrasive such as a sand paper and the rough surface is wiped with cloth impregnated with an organic solvent known as lacquer or thinner to thereby remove dirt. Thus, the surface of the base material layer is cleaned. When the base material is composed of concrete, adherent efflorescence and laitance are carefully removed from the surface of the base material layer with the use of a disc sander, a power brush or the like and the surface is washed with clean water to thereby remove dirt. Adherent water is removed by natural air drying or heated air drying so that the surface moisture is not higher than 10% by weight. When the base material is composed of carbon steel, mill scale and rust are removed with the use of a disc sander, a power brush or the like, and the surface of the base material is wiped with cloth impregnated with an organic solvent to thereby remove dirt therefrom. When the base material is composed of aluminum, stainless steel or a copper alloy, the surface of the base material is lightly roughened with the use of a power brush, a sand paper or the like and wiped with cloth impregnated with an organic solvent to thereby remove dirt therefrom with the result that the surface of the base material layer is cleaned.

With respect to the above coating compositions, the thickness of the dry coating film is selected taking into account the antifouling and anticorrosive durations required for the particular structure to be rendered antifouling, the cost thereof, etc., which is generally in the following range:

|  | Applicable film thickness | Preferred film thickness |
| --- | --- | --- |
| undercoating | 5–1000 μm | 10–500 μm |
| intermediate coating | 10–100 μm | 20–60 μm |
| top coating | 20–500 μm | 50–100 μm |

A second form of the antifouling wall structure and the method of constructing the same according to the present invention will be described below.

Figure 4:
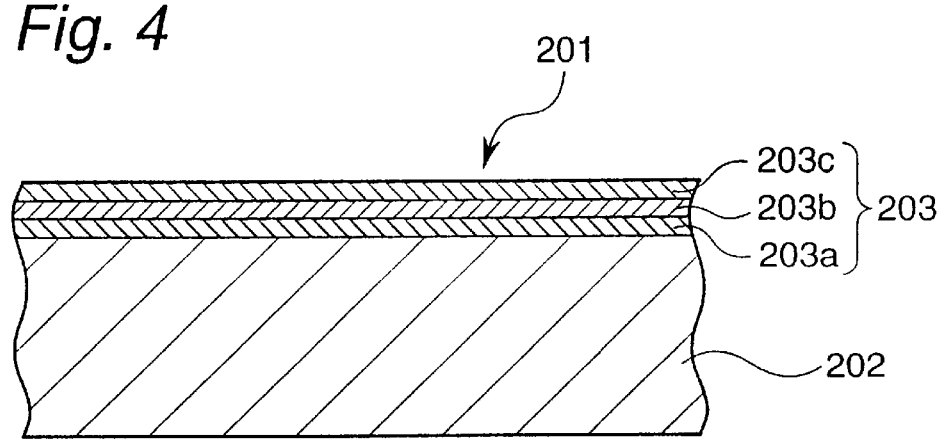
FIG. 4 is a section of the antifouling panel.

FIG. 4 is a sectional view showing the antifouling wall panel 201. As shown in FIG. 2, the antifouling wall panel 201 comprises a base material 202 such as a metal, concrete, a hard or soft plastic or a hard or soft rubber and, formed on the surface thereof, an antifouling paint layer 203. This antifouling paint layer 203 consists of an undercoating composition layer 203a, an intermediate coating composition layer 203b and an antifouling top coating composition layer 203c as in the above first form of the antifouling wall panel. The antifouling wall panel 201 is constructed by sequentially applying these coating composition layers on the surface of the base material 202.

The above base material 202, undercoating composition layer 203a, intermediate coating composition layer 203b and antifouling top coating composition layer 203c are composed of basically the same materials of base material layer 105, undercoating composition layer 106*a*, intermediate coating composition layer 106*b* and antifouling top coating composition layer 106*c* as in the above first form of antifouling wall panel, respectively.

A mode of the application of antifouling panels 201 of the above structure to the wall surface of a structure to be rendered antifouling such as a water intake channel and drain channel installed in thermal and nuclear power stations for rendering the same antifouling will be described with reference to FIGS. 5 to 17. In this mode, the structure to be rendered antifouling 204 is a box culvert type water intake channel and the ceiling surface and both side wall surfaces thereof are covered all over with the above antifouling panels 201.

Figure 5:
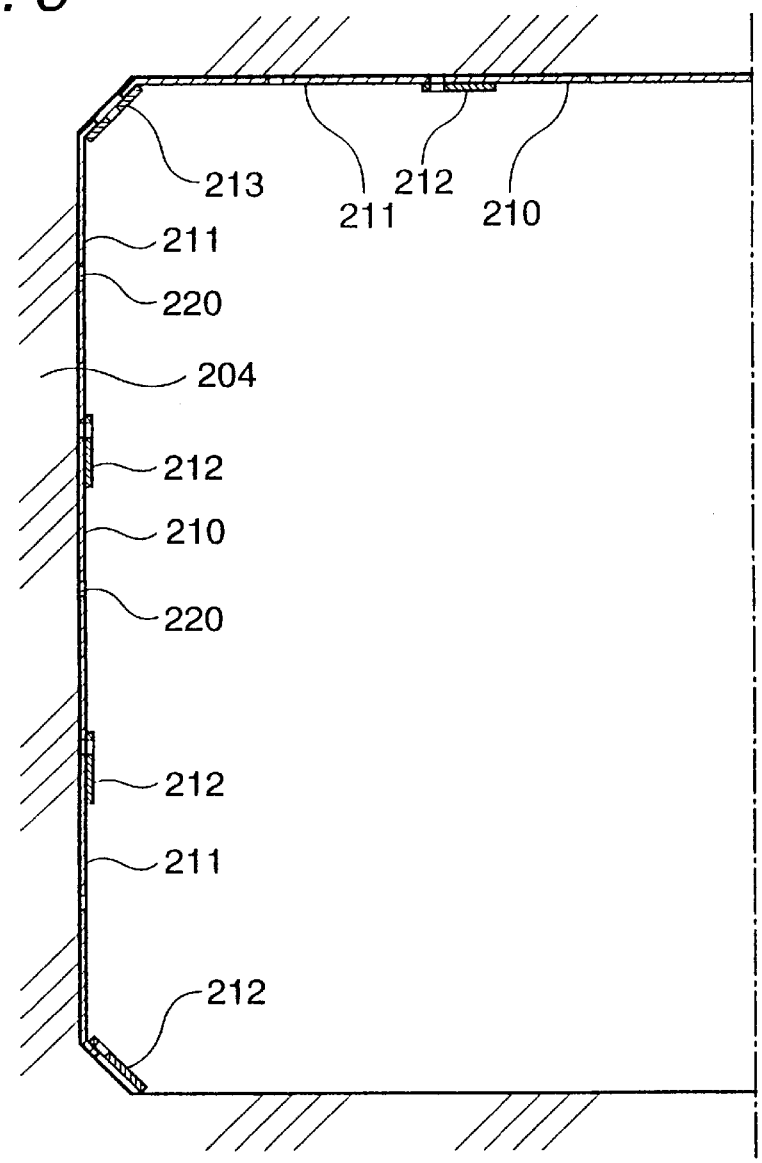
FIG. 5 is a longitudinal section front view showing a left half of the state of being rendered antifouling by the antifouling panels of FIG. 4.
Figure 6:
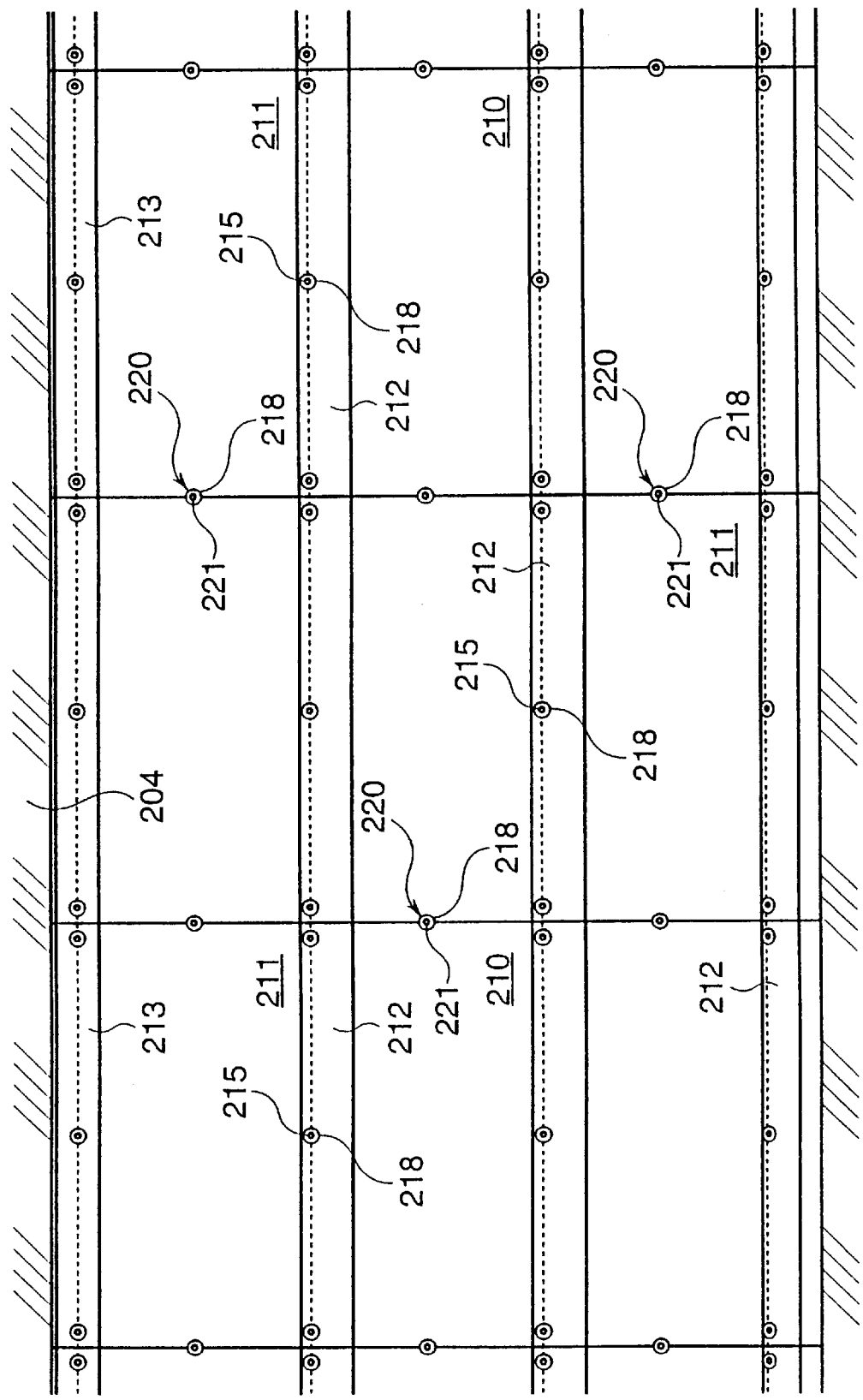
FIG. 6 is a longitudinal section side view of FIG. 5.
Figure 7:
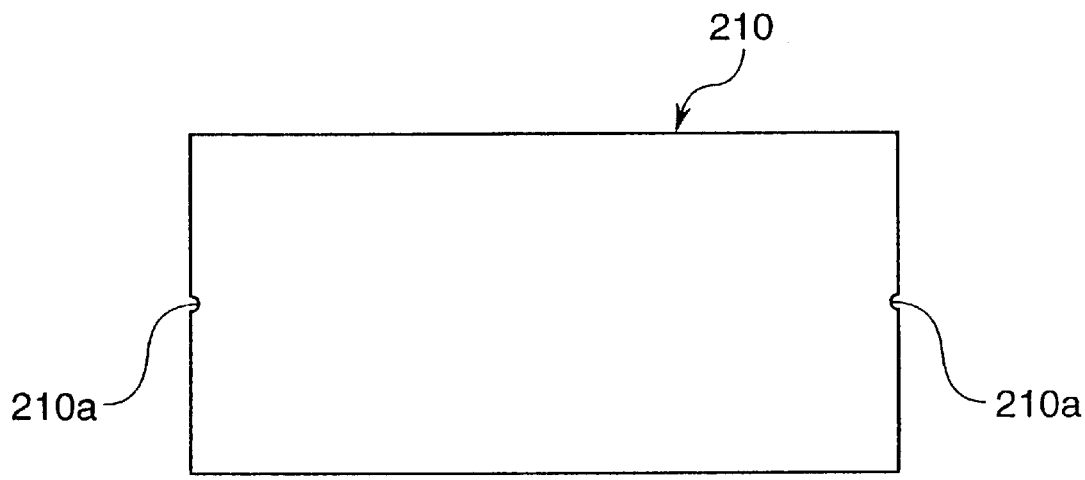
FIG. 7 is a general plan of the antifouling panel used in FIGS. 5 and 6.
Figure 8:
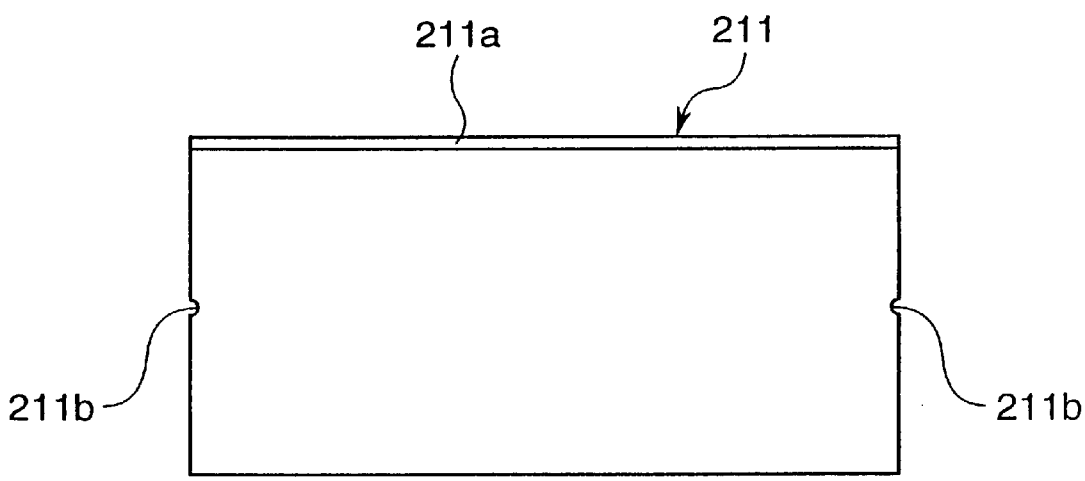
FIG. 8 is a general plan of another antifouling panel.

Referring to FIG. 5, in this mode, use is made of two god types of antifouling panels, i.e., antifouling panel 210 for central part having the form of a rectangular plate as shown in FIG. 7 and antifouling panel 211 for corner part having the form of a rectangular plate, at one side edge of which a bent part 211*a* having the shape conforming to that of corner part of the structure to be rendered antifouling 204 is formed, as shown in FIG. 8. The above antifouling paint layer 203 as shown in FIG. 4 is formed on at least the water contacting surface of these antifouling panels 210, 211.

Figure 9:
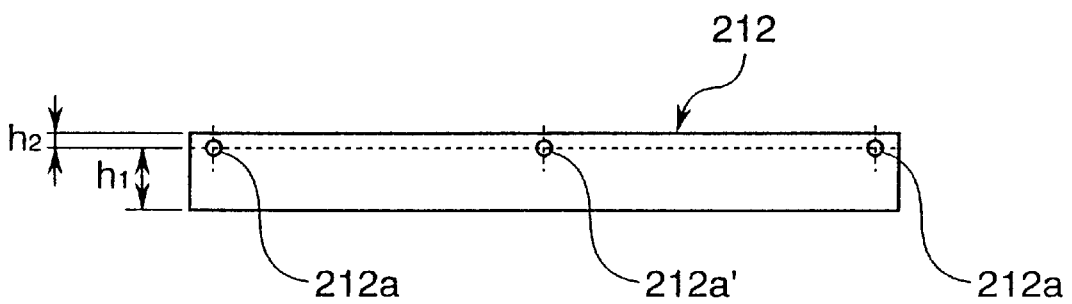
FIG. 9 is a general plan of a fixing joint plate.
Figure 10:
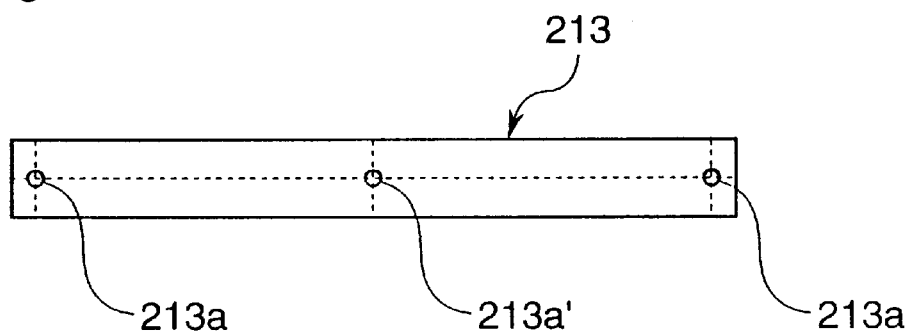
FIG. 10 is a general plan of another fixing joint plate.

Each horizontal edge of the antifouling panels 210, 211 is fixed by means of one of a fixing joint plate 212 having mounting holes 212*a* set eccentric in the width direction as shown in FIG. 9, that is, the distance $h_1$ from each mounting hole 212*a* to the lower edge being greater than the distance $h_2$ to the upper edge ($h_1 > h_2$) and a relatively wide fixing joint plate 213 having mounting holes 213*a* arranged in the center in the width direction as shown in FIG. 10. As a result, each antifouling panel is interposed between fixing joint plates.

That is, the fixing joint plate 213 is arranged at the joint portion of two antifouling panels for corner part 211, 211 disposed at an upper corner of the structure to be rendered antifouling 204, and the fixing joint plate 212 is arranged at other locations.

Figure 11:
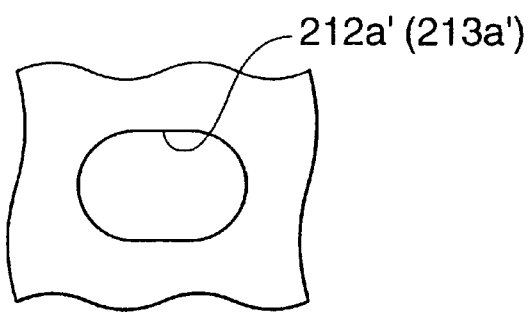
FIG. 11 is a partially enlarged view of FIGS. 9 and 10.
Figure 12:
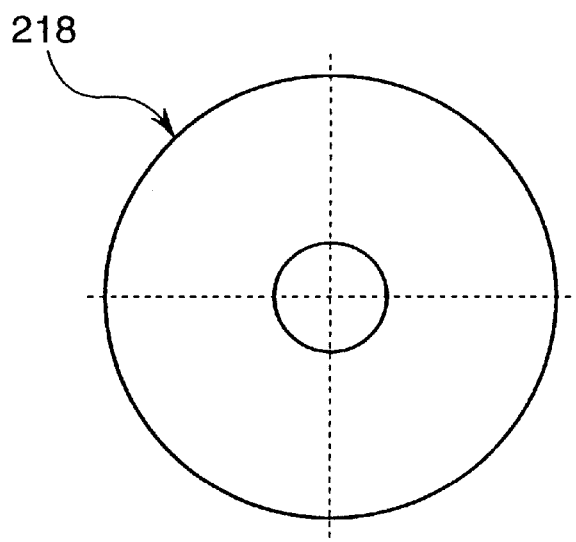
FIG. 12 is a general plan of a washer used in FIGS. 5 and 7.

Each panel has a total of three mounting holes 212*a*, 213*a* along the length of the panel. Of these, the mounting hole 212*a'*, 213*a'* positioned in the middle is preferably formed so as to have an elliptic section extending along the length of the panel as shown in FIG. 11 for facilitating the fitting of the panel.

Figure 14:
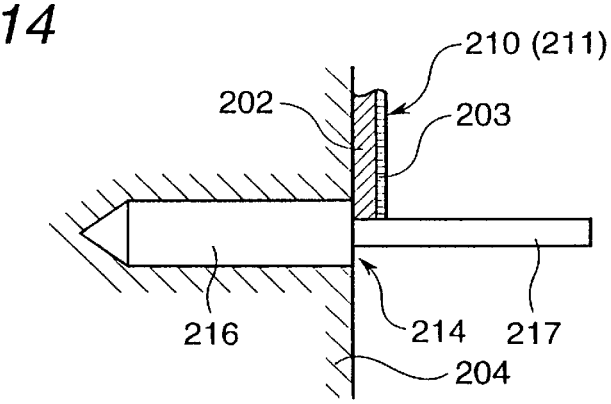
FIG. 14 is an enlarged section showing an example of part where an anchor bolt and the antifouling panel contact each other.

Each fixing joint plate 212, 213 is mounted on the structure to be rendered antifouling 204 by means of joint plate fixtures consisting of an anchor bolt 214 and a nut 215 as shown in FIG. 14. Screwing this nut 215 causes an edge of the antifouling panel 210, 211 to be held between the structure to be rendered antifouling 204 and the fixing joint plate 212, 213.

Figure 13:
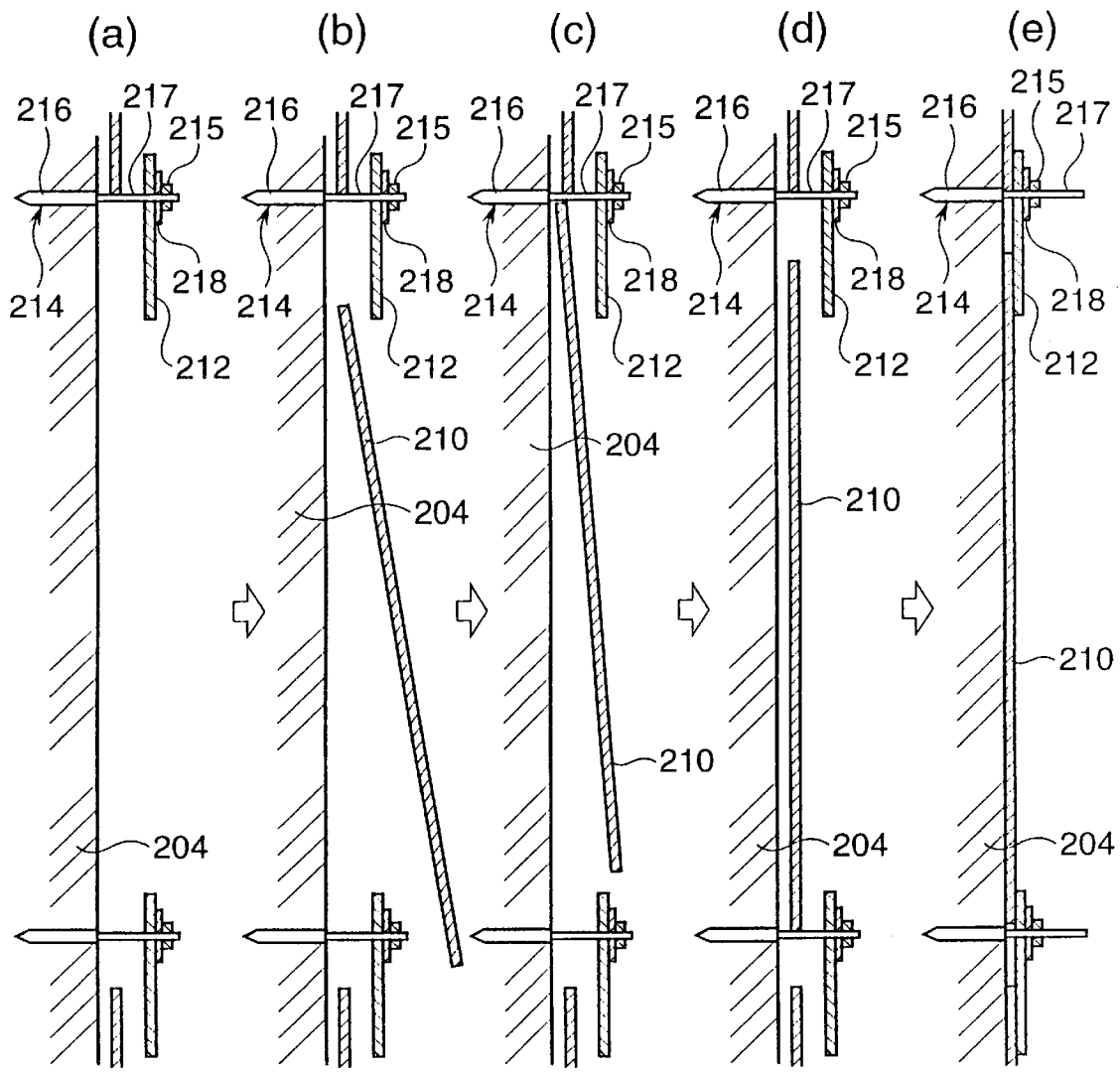
FIG. 13 is sectional views showing the steps of temporarily clamping the antifouling panel.

Illustratively, referring to FIG. 13, either anchor bolts 214 are caused to project from the wall surface of the structure to be rendered antifouling 204 by tapping anchors 216 in the structure to be rendered antifouling 204 and threadedly engaging bolts 217 with the anchors 216 or, at the time of new installation, anchor bolts 214 are plunged in advance at specified positions. The anchor bolts 214 are put through the mounting holes 212*a* (or 213*a*) of the fixing joint plate 212 (or 213) and the nuts 215 are screwed on the bolts with washers 218 of slightly larger diameter interposed therebetween.

As shown in FIG. 13, the spacing between mutually neighboring fixing joint plates 212, 213 and the respective widths thereof are so set that the antifouling panel 210, 211 can be temporarily fixed in the state of preventing falling thereof.

Illustratively, on the side wall of the structure to be rendered antifouling 204, the falling of the antifouling panel 210 (or 211) can be prevented by lifting the antifouling panel 210 (or 211) while inserting an upper edge thereof in the clearance between the wall surface of the structure to be rendered antifouling 204 and the fixinq joint plate 212 (or 213) and thereafter, while pulling downward the antifouling panel 210 (or 211), inserting a lower edge thereof in the clearance between the wall surface of the structure to be rendered antifouling 204 and the fixing joint plate 212 (or 213), as apparent from FIG. 13.

That is, causing the fixing joint plate 212 to have mounting holes 212*a* set eccentric in the width direction of the fixing joint plate 212 as mentioned above renders the clearance between the wall surface of the structure to be rendered antifouling 204 and the fixing joint plate 212 which is formed under the mounting holes 212*a* larger than that which is formed over the mounting holes 212*a*, thereby enabling the above mounting of the antifouling panel 210 (or 211).

On the ceiling part as well, the falling of the antifouling panel can be prevented by inserting one edge of the antifouling panel in the clearance between the wall surface of the structure to be rendered antifouling and the fixing joint plate, followed by insertion of the other opposite edge in the same manner as above.

Figure 15:
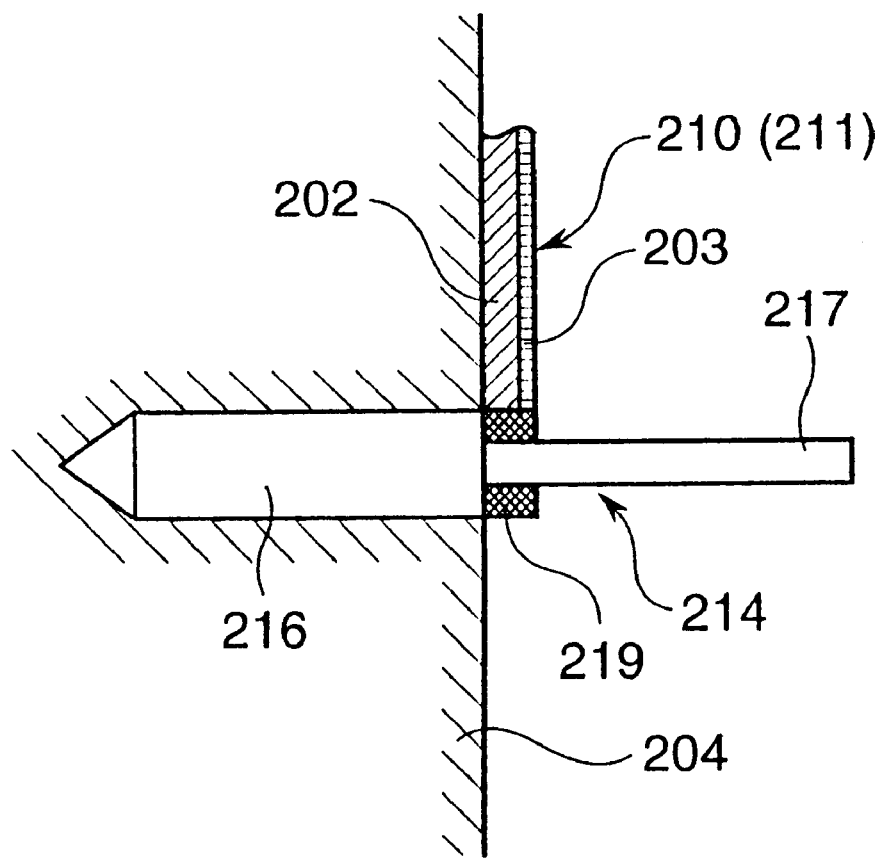
FIG. 15 is an enlarged section showing another example of part where an anchor bolt and the antifouling panel contact each other as in FIG. 14.

Referring to FIG. 14, there is the danger of abnormal corrosion caused by the direct contact of end faces or the anchor bolt 214 and antifouling panel 210 (or 211) when these are made of different metal species, for example, the one is made of iron while the other is made of SUS. However, any corrosion inviting short circuit can be avoided by fitting an insulating tube 219 on the anchor bolt 214 as shown in FIG. 15.

Each antifouling panel 210, 211 has both horizontal edges thereof held between the structure to be rendered antifouling 204 and the fixing joint plate 212, 213 by screwing the nuts 215 in that state to thereby attain fixing of the antifouling panel 210, 211. The nuts 215 are covered with caps according to necessity.

Even if the antifouling panel 210, 211 is secured at both the horizontal edges thereof in the above manner, a difference in level occurs between antifouling panels which are mutually neighboring in the lateral direction because of the wall surface irregularity and difference in level of the structure to be rendered antifouling 204, Such a difference in level may cause seawater to flow thereinto, so that the antifouling panel suffers from vibration and attachment and growth of organisms cannot be prevented. For avoiding this disadvantage, the following structure is provided.

Referring to FIG. 7, the antifouling panel 210 for central part has a semicircular dent 210*a* around the middle of each of right and left edges thereof in the width direction. Also, the antifouling panel 211 for corner part has a semicircular dent 211*b* around the middle of each of right and left edges thereof in the width direction, as shown in FIG. 8.

The antifouling panels 210 for central part are laid in mutually abutting relationship in the lateral direction, and so are the antifouling panels 211 for corner part. At the laying, lateral direction fixtures 220 are arranged so as to position in circular holes formed by the above dents 210*a*, 210*a* or dents 211*b*, 211*b*.

This lateral direction fixture 220 consists of a nut anchor (not shown) plunged in the structure to be rendered antifouling 204 and a bolt 221 which threadedly engages with the anchor. First, the nut anchor is tapped through the above formed circular hole in the structure to be rendered antifouling 204 and, then, the bolt 221 is screwed with the washer 218 interposed therebetween to thereby fix the antifouling panels. According to necessity, the bolt 221 is capped.

It is preferred that the water contacting surfaces of the above fixing joint plate 212, 213, washer 218 and fixtures be coated with antifouling paint in advance as is for the antifouling panel 210, 211.

The method of constructing the above antifouling wall will be described below.

First, measuring and line drawing are conducted on the wall surface of the structure to be rendered antifouling 204. Then, perforation by means of an impact drill is carried out at each site where the fixing joint plate 212, 213 is set, specifically, at positions corresponding to the mounting holes 212a, 213a thereof with the use of a full scale drilling plate, The anchor 216 is driven in each of the resultant holes and the bolt 217 is threadedly engaged with the anchor 216, so that the anchor bolt 214 projects. In the case of new installation, the anchor bolts 214 are plunged in advance at specified positions.

According to necessity, as mentioned above, the anchor bolts 214 are fitted with the insulating tubes 219. Each of the fixing joint plates 212, 213 is mounted by putting the anchor bolts 214 through the mounting holes 212a, 213a thereof and slightly screwing the nuts 215 with the washers 218 interposed therebetween.

At this stage, the antifouling panels 210, 211 manufactured in advance in factories are carried in, As mentioned above, the antifouling panel 210 is mounted by first inserting one edge thereof in one clearance between the wall surface of the structure to be rendered antifouling 204 and the fixing joint plate 212, 213 and then inserting the other edge thereof in the other clearance between the wall surface of the structure to be rendered antifouling 204 and the fixing joint plate 212, 213 and temporarily fixed so as to prevent falling.

Illustratively, as shown in FIG. 13(a), the clearance between the wall surface of the structure to be rendered antifouling 204 and the fixing joint plate 212 which is formed under the bolt 217 is larger than that which is formed over the bolt 217. Thus, as shown in FIG. 13(b), the antifouling panel 210 is lifted while inserting an upper edge thereof in the clearance between the wall surface of the structure to be rendered antifouling 204 and the fixing joint plate 212, so that the upper edge of the antifouling panel 210 is completely put in the clearance, as shown in FIG. 13(c). Thereafter, as shown in FIG. 13(d), the antifouling panel 210 is pulled downward while urging the same forward. As a result, as shown in FIG. 13(e), the lower edge of the antifouling panel 210 is inserted in the clearance between the wall surface of the structure to be rendered antifouling 204 and the fixing joint plate 212. This arrangement enables preventing falling of the antifouling panel 210.

Thereafter, the antifouling panels 210, 211 are laid in the lateral direction with the edges thereof arranged in mutually abutting relationship. The nuts 215 are screwed and, according to necessity, capped.

Nut anchors are tapped through the circular holes formed by the dents 210a, 211b of the antifouling panels 210, 211 at the lateral mutually abutting portion of the antifouling panels 210, 211. The bolts 221 are screwed into the anchors with the washers 218 interposed therebetween. Thus, the setting work is completed.

The antifouling wall structure for pipe structures and method of constructing the antifouling wall structure according to the present invention will be described below with reference to appended drawings.

Figure 16:
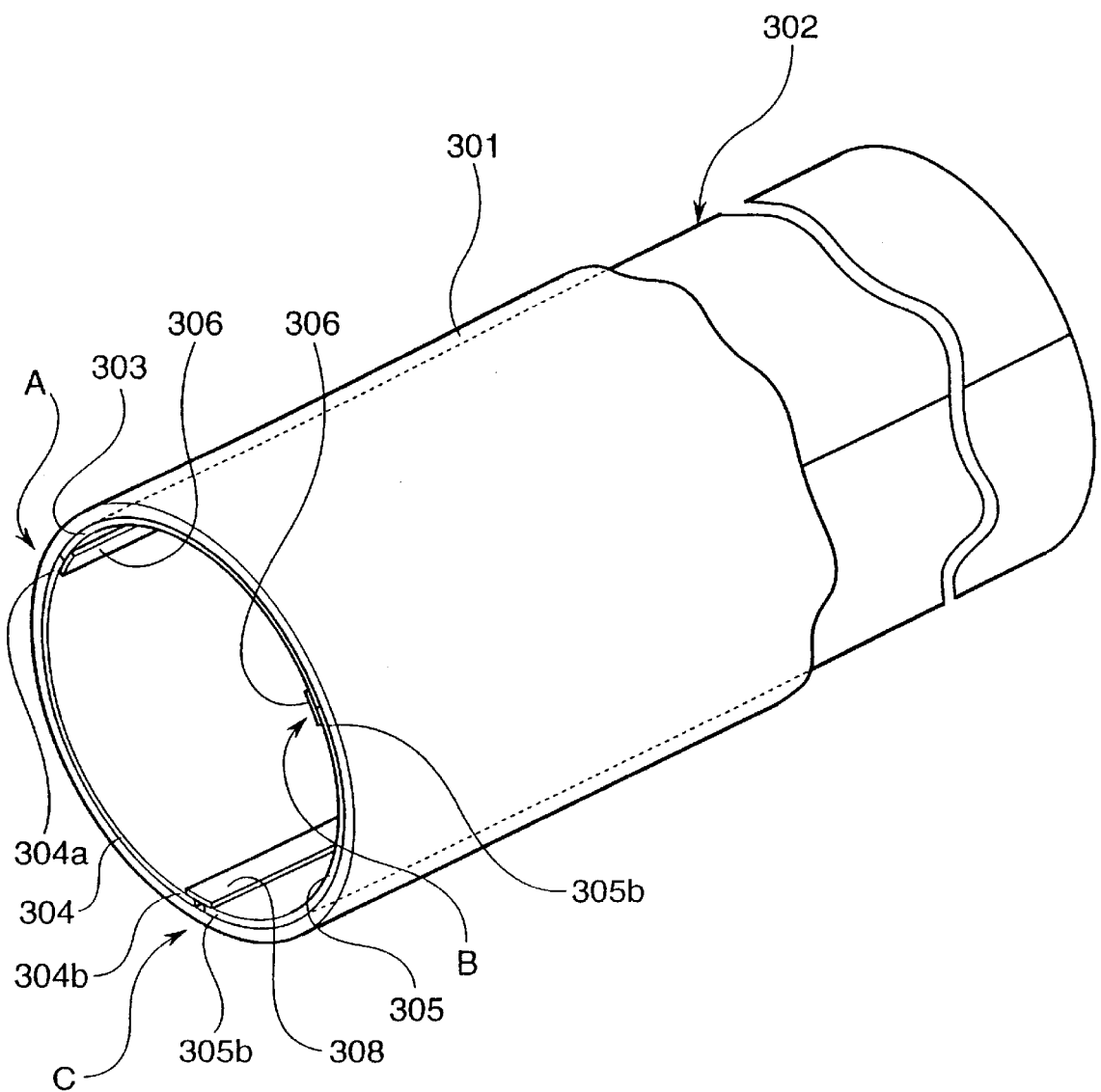
FIG. 16 is a perspective view of a cooling water intake pipe for use in thermal and nuclear power stations, in which the antifouling wall structure for pipe structures according to the present invention is employed.

FIG. 16 shows one mode of new application of the antifouling wall structure according to one embodiment of the present invention to a cooling water intake pipe having been constructed in seawater and being operated as a facility of a thermal power station.

This cooling water intake pipe 301 for thermal power station forms an outer ring in the figure. It is installed about 10 m below the surface of the water and has an internal diameter of 1900 mm and an entire length of about 400 m. The cooling water intake pipe 301 having such a pipe structure is generally made of steel plates, concrete or the like.

An antifouling panel 302 capable of minimizing the attachment and growth of oceanic life is detachably secured to the inner wall surface of the above cooling water intake pipe 301 so that the cooling water intake pipe's becoming a hotbed for oceanic life carried by water flow can be avoided.

Figure 17:
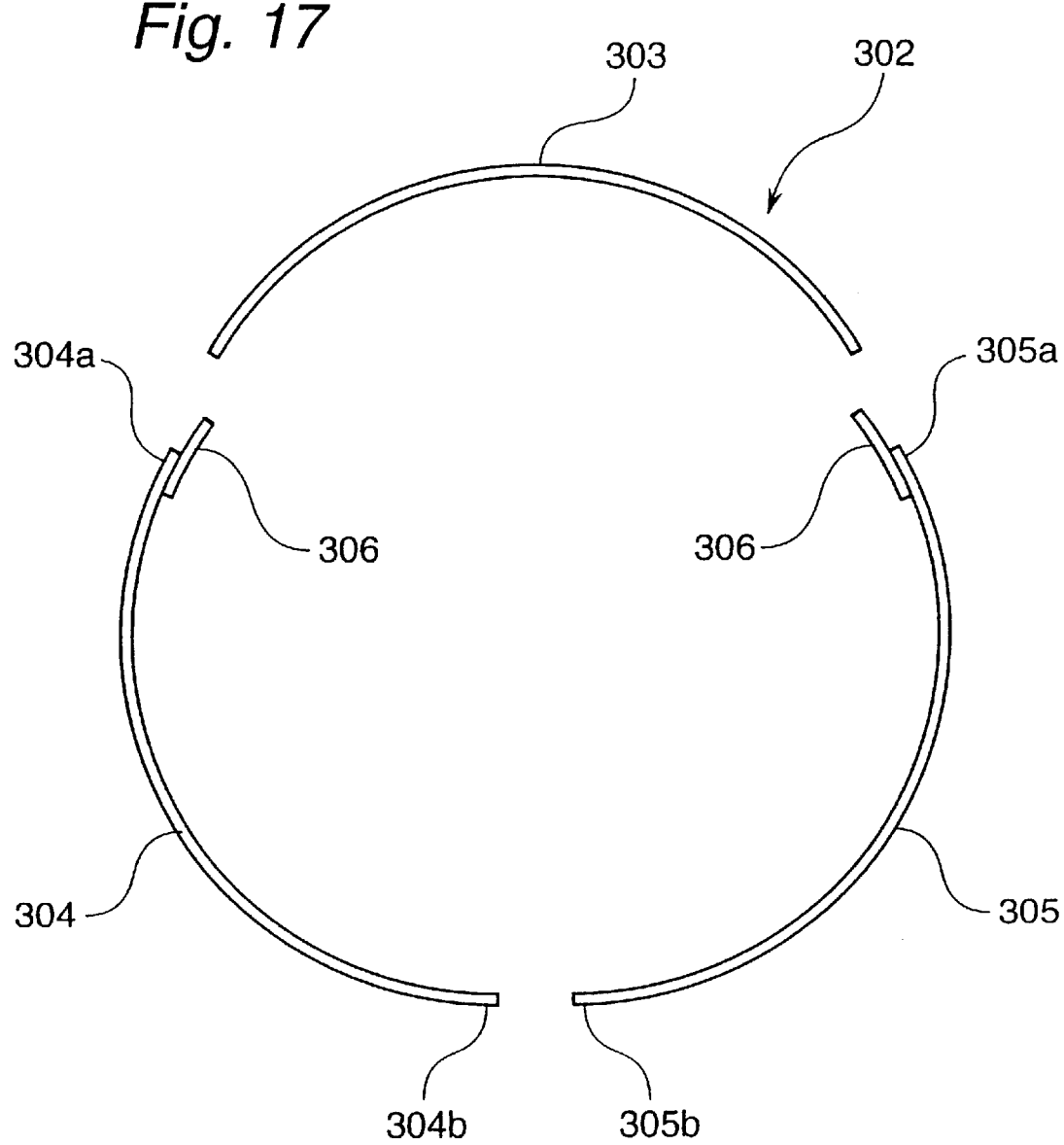
FIG. 17 is an exploded front view of the antifouling panel used in FIG. 16.

The above antifouling panel 302 is a synthetic resin such as FRP having a surface coated with an antifouling paint. It consists of, for example, three or four concentric divisions as shown in FIG. 17. In this embodiment, the antifouling panel 302 consists of three divisions, i.e., first division 303 (upper panel), second division 304 (side panel) and third division 305 (side panel). These divisions are required to be resistant to fluids and to possess appropriate self sustaining strength, so that it is preferred that the thickness thereof range from about 5 to 20 mm.

Figure 18:
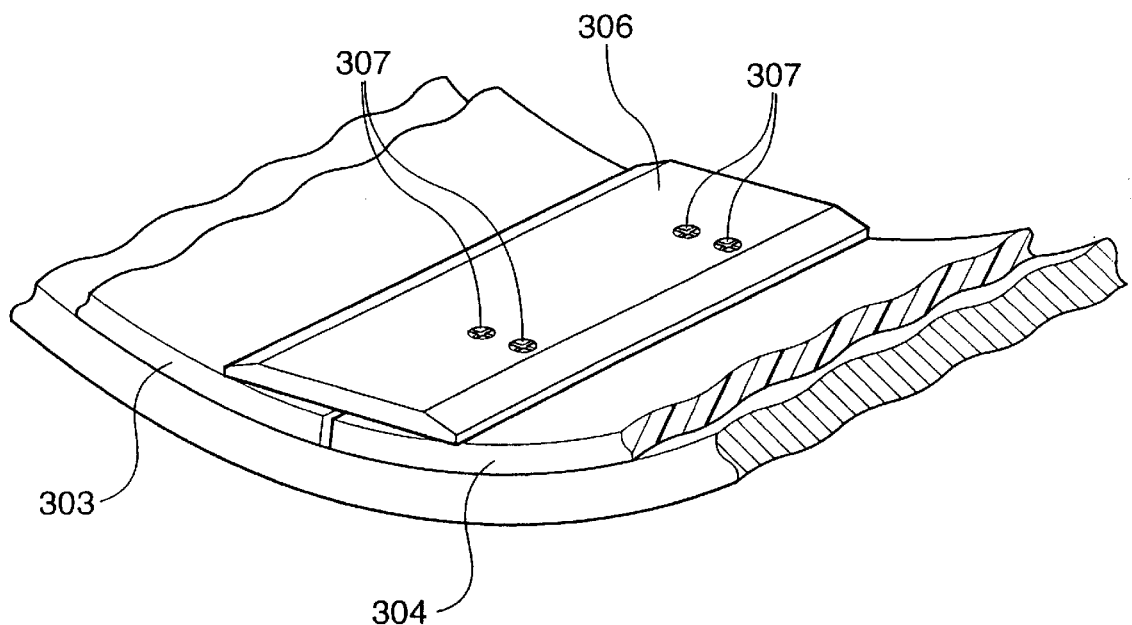
FIG. 18 is an enlarged perspective view of part A of FIG. 16.

Shoulder part A where the first division 303 is connected to the second division 304 and shoulder part B where the first division 303 is connected to the third livision 305 are assembled by the same structures, whose detail is as shown in FIG. 18. That is, each of these first, second and third divisions has the form of substantially a circular arc, and one edge 304a of the second division 304 and one edge 305a of the third division 305 are integrally fitted with respective fitting pieces 306. The fitting of fitting piece 306 may be accomplished either by integral molding with the second division 304 and third division 305 or by fixing separately molded one with screws 307, 307 as shown in FIG. 18.

Figure 19:
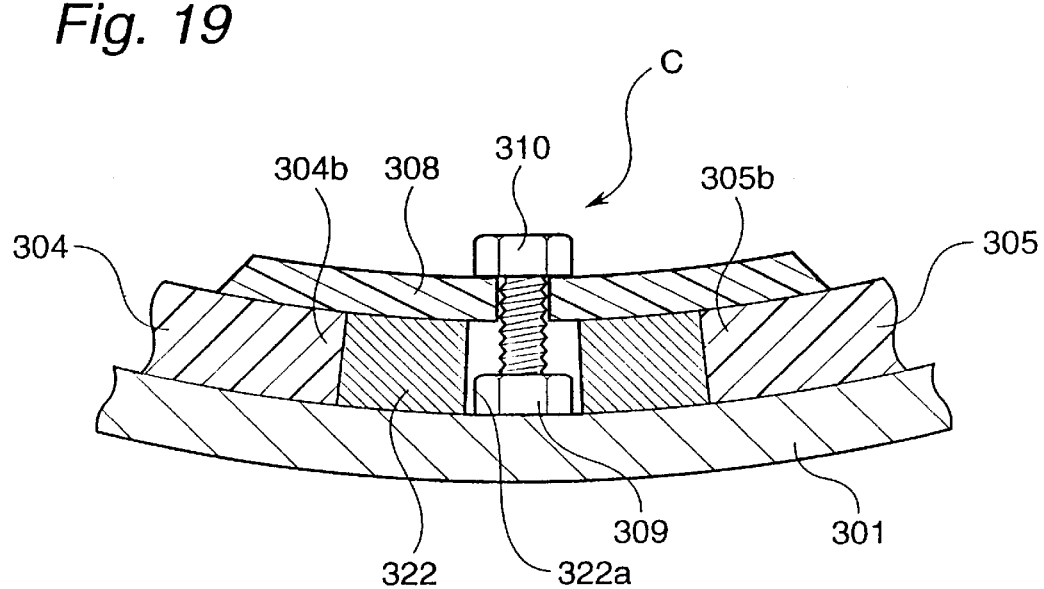
FIG. 19 is an enlarged sectional view of part C of FIG. 16.

On the other hand, bottom part C where the second division 304 is connected to the third division 305 is assembled as shown in FIGS. 16 and 19.

Illustratively, at the bottom part C, the other edge 304b of the second division 304 and the other edge 305b of the third division 305 are detachably fixed by means of a plate lock 308 obtained by separate molding of a rubber or a synthetic resin such as FRP.

This plate lock 308 is arranged in the form of a strap long along the direction of flow of the fluid and is fixed by threaded engagement of a lock nut 309 and a bolt 310 as described later.

The procedure to be followed in actually applying the antifouling panel 302 to the inner wall surface of the cooling water intake pipe 301 built underwater will be described in detail below.

The cooling water intake pipe 301 is made of steel plate and its internal surface has a zinc plate for electric anticorrosion provided at appropriate position.

In newly applying the antifouling panel 302 to the above cooling water intake pipe 301, first, a diver removes marine organisms from the cooling water intake pipe 301 and also temporarily removes the zinc plate for electric anticorrosion.

Figure 20:
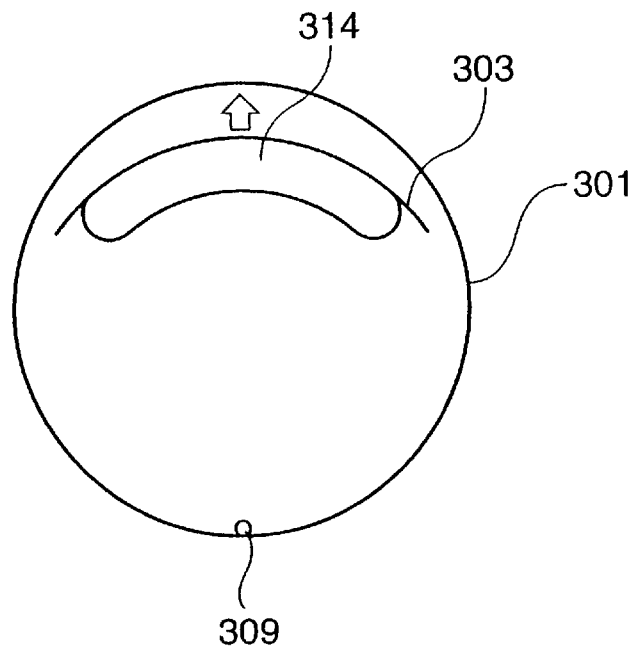
FIG. 20 is a schematic view explaining one step employed in the method of constructing an antifouling wall according to the present invention.

During this work, a plurality of lock nuts 309 are welded to a bottom part of the inner wall surface of the cooling water intake pipe 301 as shown in FIGS. 19 and 20. These lock nuts 309 are arranged at predetermined intervals in the direction of flow of the fluid on the inner wall surface of the cooling water intake pipe 301, Later, the above zinc plate is fixed by means of lock nuts 309 arranged at appropriate position.

Upon completion of the welding of the above lock nuts 309, the first division 303 (upper panel) to be arranged at a ceiling part is carried underwater. Referring to FIG. 20, this first division 303 is floated up to an upper part of the cooling water intake pipe 301 by the use of the buoyancy of an air bag 314. This first division 303 is kept afloat until the fitting work thereof is completed.

Figure 21:
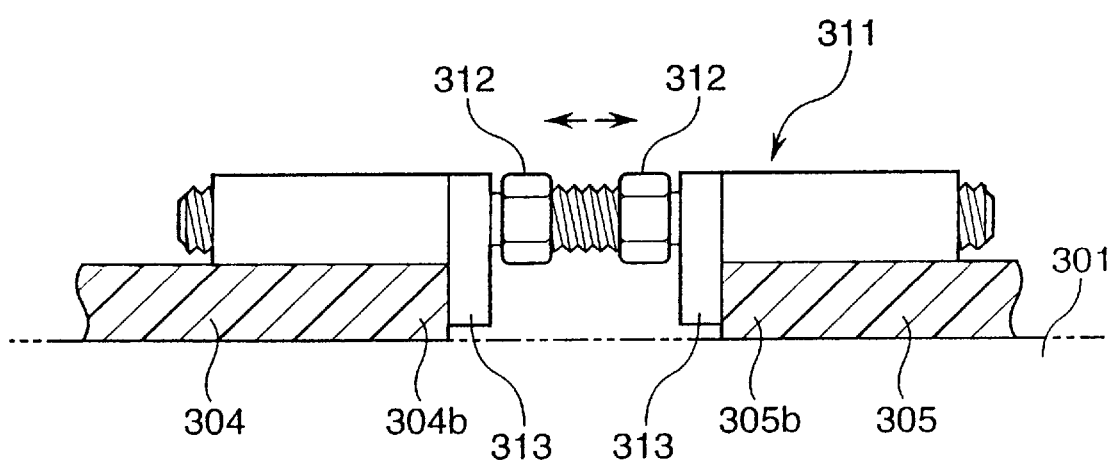
FIG. 21 is a sectional view explaining another step employed in the method of constructing an antifouling wall according to the present invention, in which an extender jig in use is illustrated.

Subsequently, two side panels, i.e., the second division 304 and the third division 305 are assembled at the respective sides of the first division 303. The one edge 304a of the second division 304 and the one edge 305a of the third division 305 are provided with the respective fitting pieces 306, 306, so that both edges of the first division 303 are fitted as shown in FIG. 18 with the use of projections of the fitting pieces 306, 306. Thus, the three divisions 303, 304, 305 can be assembled in the form of a ring. However, the bonding strengths of the three divisions are still poor, so that an extender jig 311 capable of width adjustment as shown in FIG. 21 is provided between the other edge 304b of the second division 304 and the other edge 305b of the third division 305. Thereafter, a baffle 322 is fitted.

The procedure for fitting the baffle 322 with the use of the extender jig 311 will be described below.

Figure 22:
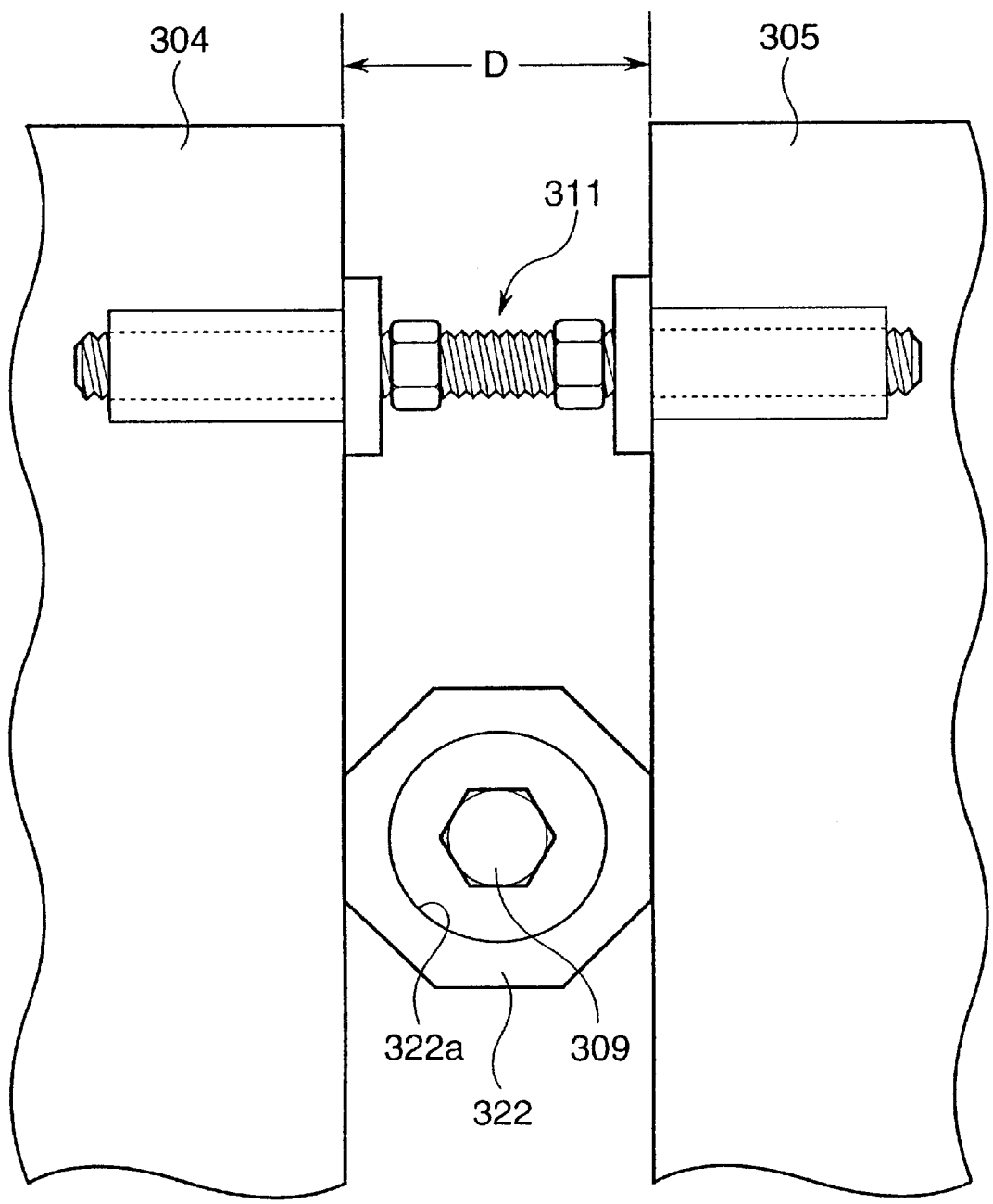
FIG. 22 is a plan explaining the state of use of the extender jig employed in the method of constructing an antifouling wall according to the present invention.

After the assembly of the three divisions on the inner wall surface of the cooling water intake pipe 301, the extender jig 311 provided in advance is inserted between the other edge 304b of the second division 304 and the other edge 305b of the third division 305, as shown in FIG. 21. Screwing the nuts 312, 312 of the extender jig 311 causes central tongue pieces 313, 313 to move left and right, so that the spacing between the edge 304b and the edge 305b is expanded. Thus, the second division 304 and the third division 305 are brought into contact with the respective edges of the first division 303 without any gap. Simultaneously, the first, second and third divisions 303, 304, 305 are brought into close contact with the inner wall surface of the cooling water intake pipe 301. The extender jig 311 is removed at a later time. Therefore, referring to FIG. 22, the baffle 322 having a hole 322a is interposed between the second division 304 and the third division 305 so as to enclose the lock nut 309 disposed in the gap therebetween in order to prevent the second division 304 and the third division 305 from having access to each other when the extender jig 311 is removed. This enables holding the spacing D between the edges constant.

In this manner, a plurality of baffles 322 are interposed between the second division 304 and the third division 305, and the extender jig 311 is removed. Thus, the spacing D is held constant by means of the baffles 322.

Slender plate lock 308 is arranged in the direction of flow of the fluid over the other edge 304b of the second division 304 and the other edge 305b of the third division 305. The length of the plate lock 308 is substantially the same as that of each division, and it is preferred that elliptic holes be formed in the plate lock 308 at predetermined intervals such that the bolts 310 can be put through the lock nuts 309.

Upon the arrangement of the plate lock 308, threadedly engaging the bolts 310 with the lock nuts 309 enables holding the other edge 304b of the second division 304 and the other edge 305b of the third division 305 in a manner such that they are no longer movable.

The assembly of the antifouling panel, as an integral structural unit, consisting of the first division 303, the second division 304 and the third division 305 on the inner wall surface of the cooling water intake pipe 301 is completed according to the above procedure.

When the antifouling panel consisting of three divisions is assembled on the inner wall surface of a cooling water intake pipe as long as, for example, 400 m, a vast plurality of the above panel units 320 as structural units are required. Thus, a vast plurality of panel units 320 are provided and sequentially assembled.

At the time of the assembly, neighboring panel units are preferably positioned with a slight gap therebetween at joints such as shoulder parts A, B and bottom part C. If the antifouling paint is applied to any clearance or the like which occurs between the panel units and at the division joints, the attachment of oceanic life can be prevented with increased effectiveness.

Figure 23:
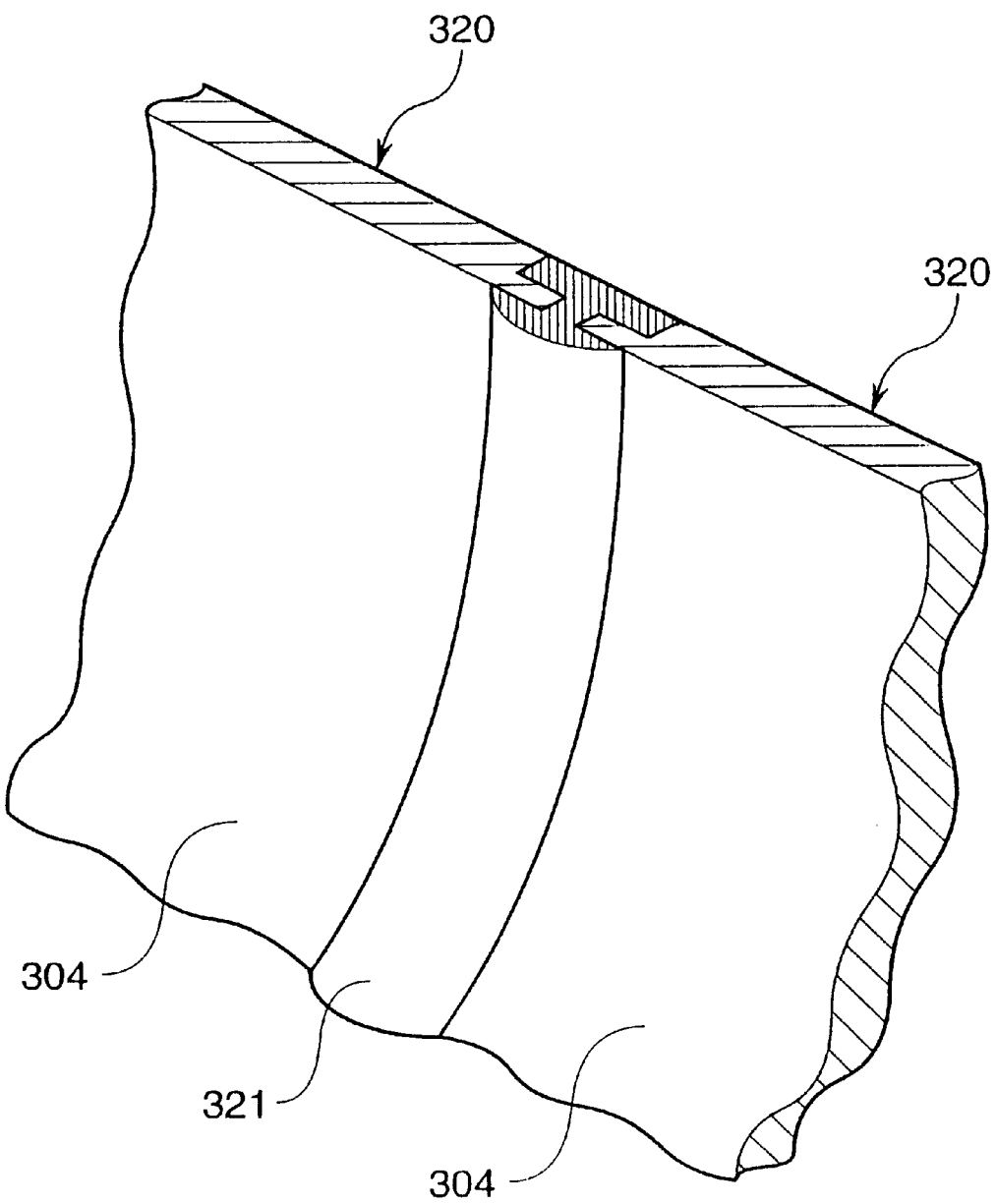
FIG. 23 is a perspective view showing the state of connection between panel units according to one embodiment of the present invention.
Figure 24:
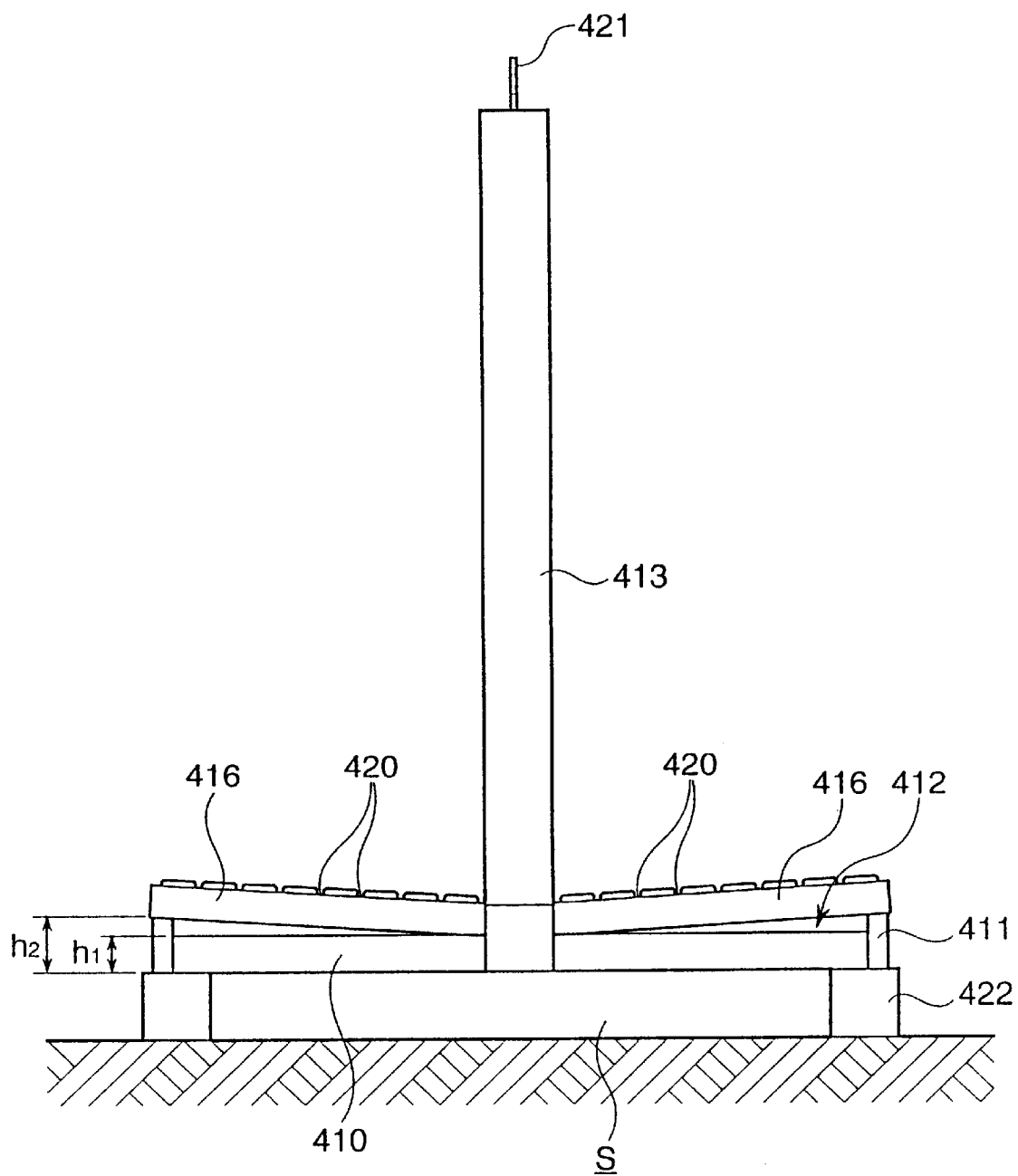
FIG. 24 is a side view showing the first transporter most suitable for use as a container.
Figure 25:
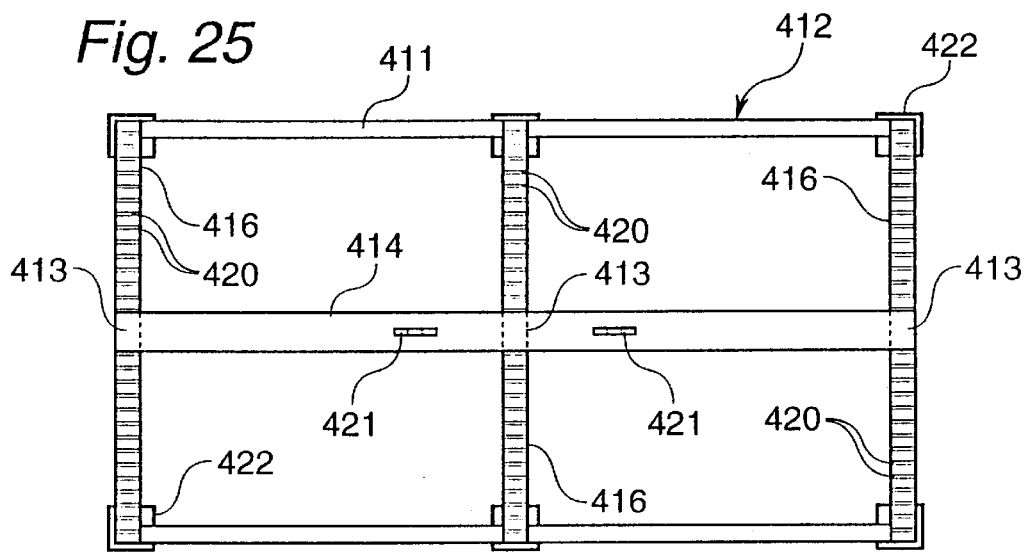
FIG. 25 is a plan of the first transporter.
Figure 26:
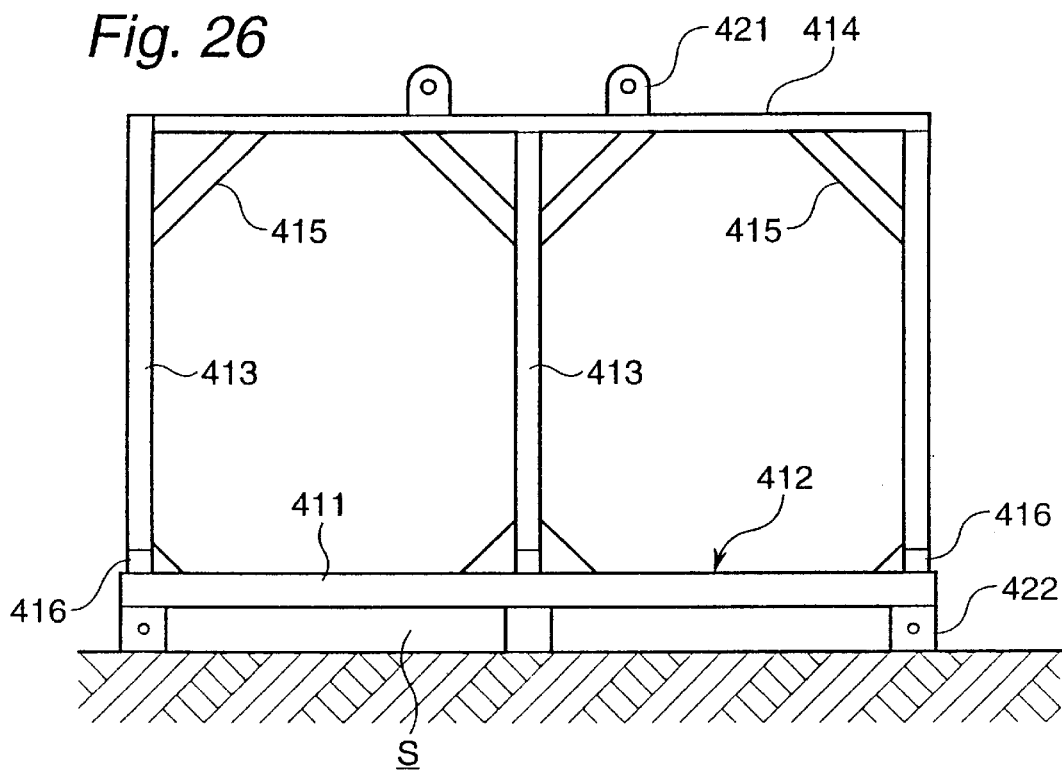
FIG. 26 is a front view of the first transporter.
Figure 27:
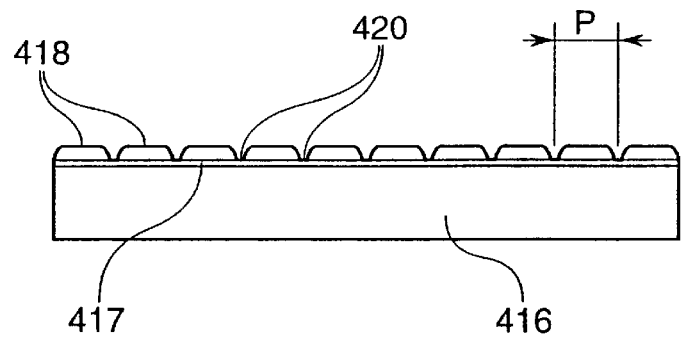
FIG. 27 is a front view of a support plate for use in the first transporter.

A ring connector 321, for example, as shown in FIG. 23 is preferably inserted between the panel units 320, 320 arranged in the direction of flow of the fluid. This connector 321 is fabricated from a synthetic rubber or a suitable synthetic resin such as FRP, The panel units 320, 320 can be coupled in ringed form by providing a vast plurality of such ring connectors 321.

When the already installed cooling water intake pipe 301 is as long as hundreds of meters, it is preferred that air stages be disposed at intervals off for example, 50 m in the cooling water intake pipe 301 from the viewpoint that working safety is ensured. Further, it is preferred that working be performed with the manhole of the cooling water intake pipe 301 kept open.

In the above manner, the antifouling panel 302 composed of a synthetic resin can be safely and easily installed in the cooling water intake pipe 301 having already been constructed underwater. After the completion of the fitting work, when a given period of time ensuring the prevention of the attachment of oceanic life expires, the antifouling panel 302 can be removed and replaced by another antifouling panel consisting of divisions. The removed antifouling panel 302 can be recycled.

Examples of the pipe structures contemplated in the present invention include not only cooling water intake pipes installed in thermal and nuclear power stations and other seaside plants but also drainpipes, pipe structures installed in the sea such as submarine pipelines and pipe structures installed in fresh water.

The same material as in the above first and second forms of antifouling panels can be used in the divisions of this form of antifouling panel 302 of the present invention.

Although the above embodiment illustrates an example of the application of the antifouling wall to the already installed pipe structure, the antifouling wall can naturally be applied to a pipe structure to be newly installed. In this application as well, the antifouling panel is detachably secured to the inner wall surface of the pipe structure.

Further, although the above embodiment is concerned with an example of the cooling water intake pipe 301 made of steel plates, naturally, the cooling water intake pipe can be made of concrete. In the use of concrete, the divisions can be fixed on the inner wall surface of the cooling water intake pipe 301 made of concrete by plunging chemical anchors instead of welding lock nuts.

The configurations of extender jig 311, fitting piece 306 and baffle 322 are never limited to those mentioned in the above embodiments.

As described above, the antifouling wall panel has a surface coated with precious film. Thus, a transporter capable of carrying and safekeeping the antifouling wall panel without injuring the coating film thereof separately is needed, which will be illustrated below.

FIGS. 24 to 30 show the first form of transporter which is most suitable for not only the safekeeping and carrying of the antifouling wall panel 401 but also the use as a container employed in field work. As shown therein, this transporter is equipped with a rectangular frame 412 consisting of longitudinal frame members 410 and lateral frame members 411.

A pillar 413 is stood in the center in the direction of the length of the longitudinal frame members 410, and a cross beam 414 is held on an upper end of the pillar 413. Reinforcing diagonal braces 415 are arranged between the pillar 413 and the cross beam 414.

Support plates 416 which position above the longitudinal frame members 410 and have a gradual downward inclination toward the pillar 413 are arranged on both sides of the pillar 413. The height h1 of the longitudinal frame members 410 is so set as to be smaller than the height $h_2$ of the lateral frame members 411 ($h_1 < h_2$), and each outer edge of the support plates 416 is fixed on the upper surface of the lateral frame members 411.

Figure 28:
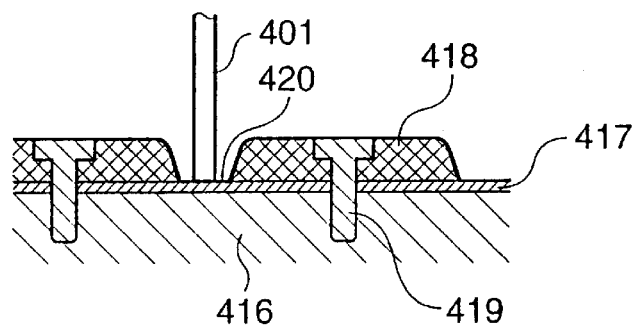
FIG. 28 is an enlarged sectional view of an essential part of FIG. 27.

Referring to FIG. 28, a hard rubber 417 is disposed all over the upper surface of the support plate 416, and hard rubber pieces 418 of specified width are disposed at specified intervals on the upper surface of the hard rubber 417 and fixed by means of fastening members 419 such as bolts. Thus, recesses each defined by mutually neighboring hard rubber pieces 418 and the hard rubber 417 of the lower side are provided on the upper surface of the support plate 416 at specified pitches p in the direction of the length of the support plate 416.

Naturally, the above hard rubber 417 and hard rubber pieces 418 can be bonded together and fixed on the upper surface of the support plate 416 by means of an adhesive.

Figure 29:
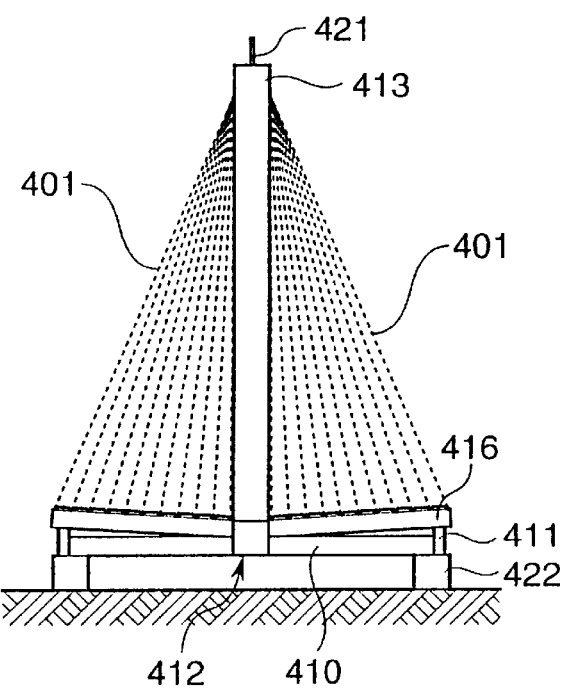
FIG. 29 is a side view of the first transporter which is in the state of having antifouling wall panels mounted thereon.

Referring to FIG. 29, the above structure enables standing antifouling wall panels 401 inclined inward against the pillar 413 in the state of having the lower edge of each antifouling wall panel 401 positioned in the recess 420 formed on the upper surface of the support plate 416. Thus, a plurality of antifouling wall panels 401 can be kept safe with specified spacings therebetween, so that the injury of coating film caused by panel contact during the carriage thereof can be avoided.

In the above arrangement, the antifouling wall panels 401 contact each other at the upper edges thereof and contact the hard rubber at the lower edges thereof. Slight coating film injury caused at the upper and lower edges of the antifouling wall panels 401 by the carriage thereof, etc. scarcely pose problems.

In this form of structure, a lifting hook 421 is secured to the cross beam 414. This lifting hook 421 is adapted to engage with a crane hook so that the whole can be lifted by a crane, This construction enables facilitating underwater work.

Support stands 422 adapted to have wheels secured thereto are arranged on the backs of four corners of the frame 412. Thus, not only can hand carriage be conducted by securing wheels 423 (see FIG. 30) to the support stands 422 but also providing the support stands 422 enables inserting the fork of a forklift into the space S made under the frame 412.

Figure 30:
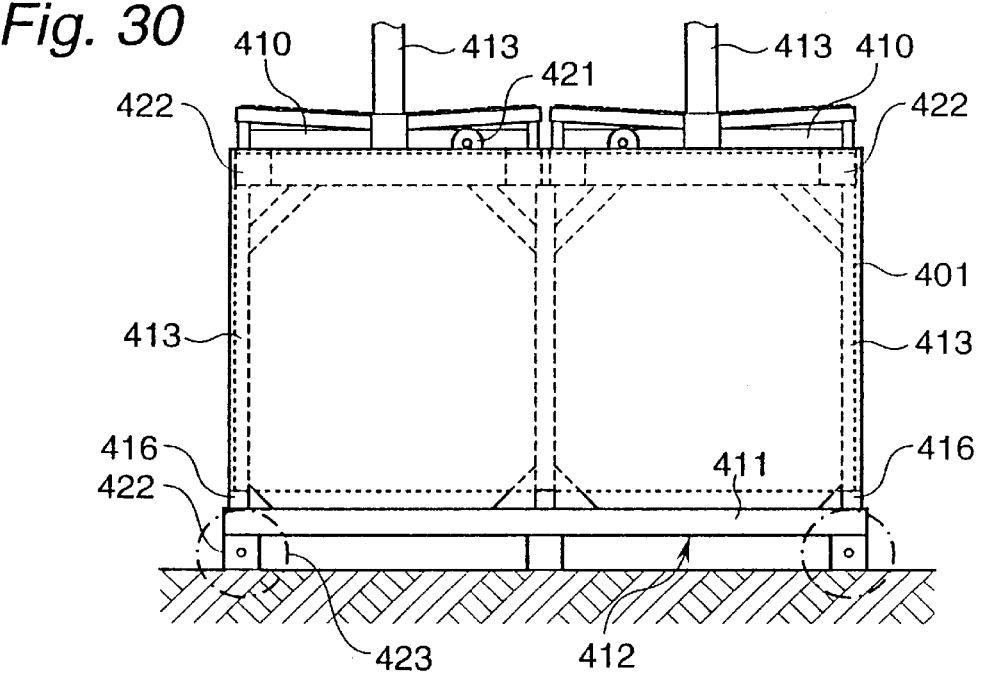
FIG. 30 is a front view showing the outine of two layers of first transporters piled one upon the other.
Figure 31:
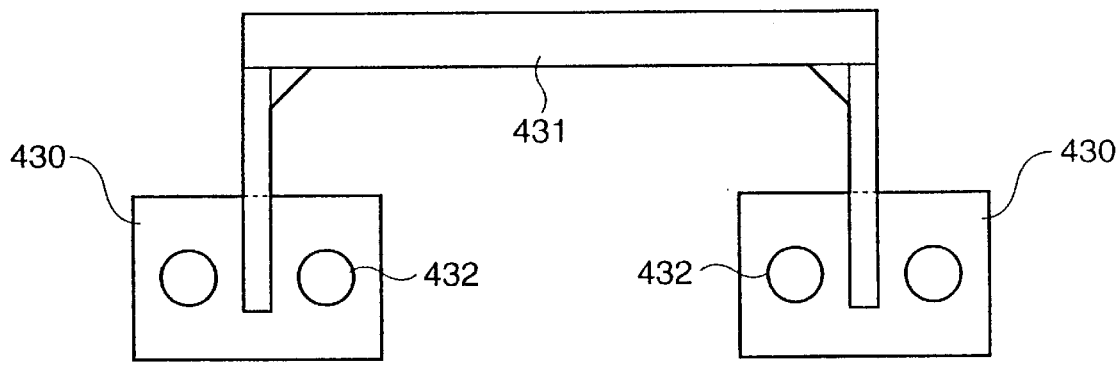
FIG. 31 is a plan showing one form of the second transporter most suitable for use as a panel holder.
Figure 32:
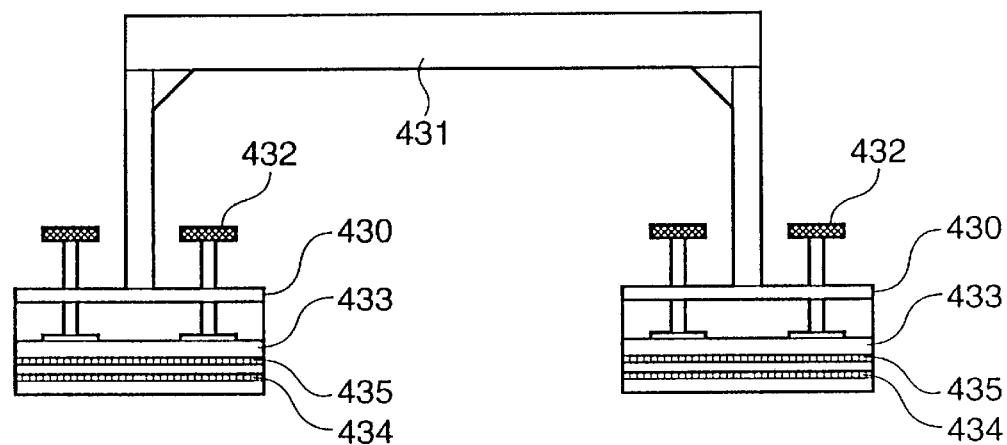
FIG. 32 is a front view of the second transporter.
Figure 33:
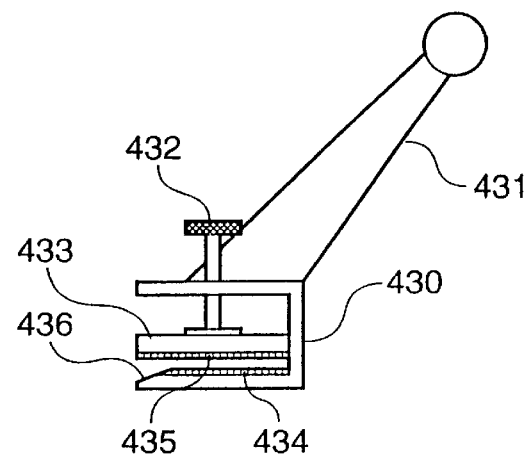
FIG. 33 is a side view of the second transporter.

Further, referring to FIG. 30, multiple piling can be effected by arranging two transporters in parallel and disposing two other transporters thereon in such a fashion that these are so arranged as to be mutually perpendicular to the below disposed transporters.

The above transporters are designed so as to facilitate the long-term safekeeping and carriage of a plurality of antifouling wall panels 401. However, at the work site, it is required to take out the antifouling wall panels 401 one by one from the above transporters prior to application to the wall surface to be rendered antifouling. A second form of transporter which is most suitable for use as a panel holder capable of meeting the above requirement will be described with reference to FIGS. 31 to 35.

As shown in the figures, this form of transporter comprises a pair of supports 430 each having a ⊃-shaped cross section which are, at their upper surfaces, connected with each other by a holder 431 as holding means.

Each support 430 has adjusting screws 432 protruding 1 5 on its side having the holder 431 fitted, and a movable plate 433 coupled with the lower faces of the adjusting screws 432 is fitted inside the support 430. The movable plate 433 is moved by driving the adjusting screws 432, so that the antifouling wall panel 401 is held between the movable plate 433 and the support 430.

The opposite faces of the support 430 and the movable plate 433 are respectively provided with rubber cushions 434, 435, so that the injury of coating film can be avoided when the antifouling wall panel 401 is held between the movable plate 433 and the support 430 as mentioned above, Further, the edge of the support 430 on its opening side is provided with a taper 436 for facilitating the entry into an interstice between mutually neighboring antifouling wall panels 401, 401.

Figure 34:
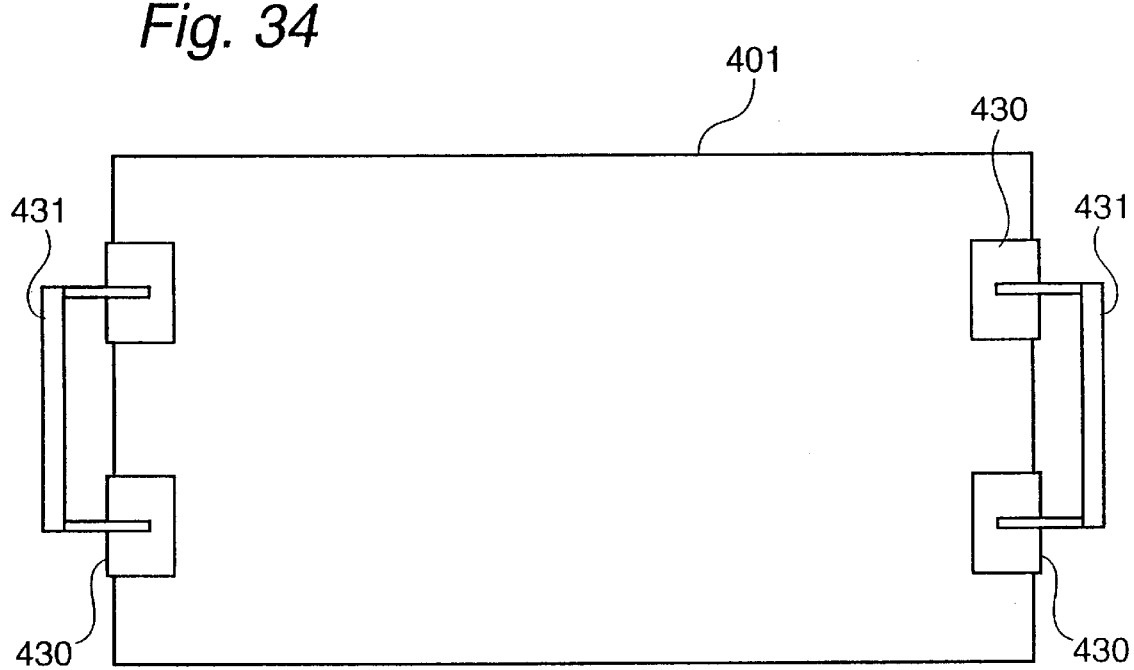
FIG. 34 is a plan showing the state of use of the second transporter.
Figure 35:
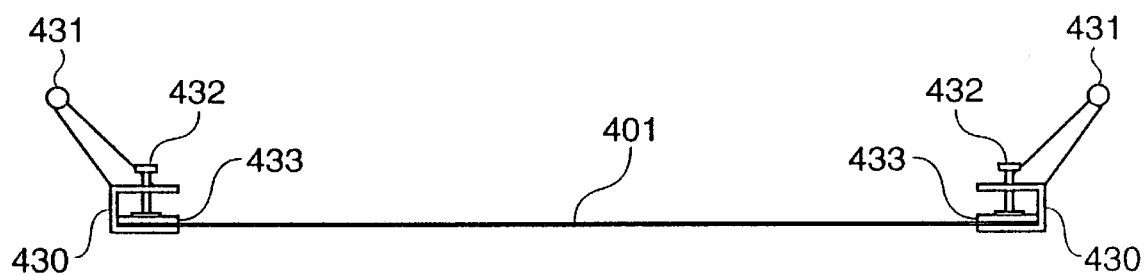
FIG. 35 is a front view of FIG. 34.
Figure 36:
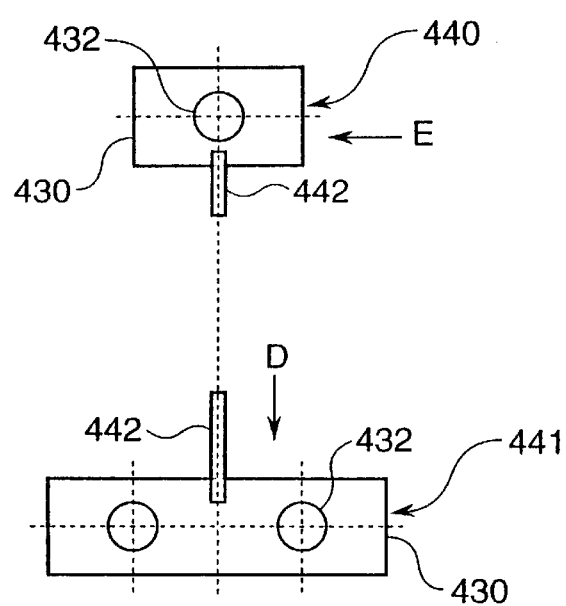
FIG. 36 is a plan of one form of the third transporter most suitable for use as a panel holder.
Figure 37:
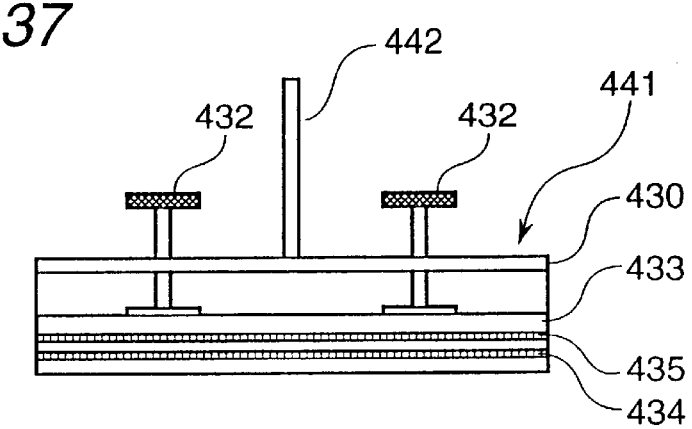
FIG. 37 is a view taken in the direction of the arrow D of FIG. 36.
Figure 38:
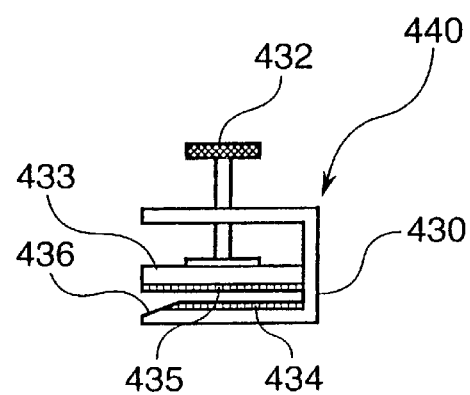
FIG. 38 is a view taken in the direction of the arrow E of FIG. 36.

Thus, when one laid on the surface side is taken out from the antifouling wall panels 401 held standing against the pillar with specified spacings therebetween as shown in FIG. 29, the supports 430 are inserted into the interstice between mutually neighboring antifouling wall panels 401, 401 at both sides thereof so that one of the antifouling wall panels 401 is interposed between the rubber cushions 434, 435 and the adjusting screws 432 are driven so as to firmly hold the antifouling wall panel 401, as shown in FIGS. 34 and 35. The antifouling wall panel 401 is lifted and taken out by hand by grasping the pair of holders 431 and, in this state, the antifouling wall panel 401 can easily be applied to the wall surface to be rendered antifouling.

The above support 430 and movable plate 433 are made of, for example, iron, FRF, stainless steel or an inorganic plate. This is true in the following form of transporter as well.

A third form of transporter which is most suitable for use as the same panel holder as described above will be illustrated with reference to FIGS. 36 to 40.

This form of transporter has substantially the same construction as above and comprises an upper part fastener 440 and a lower part fastener 441 which have morphologies different from each other along with holding means 444 composed of string members such as wires and chains connected to the fasteners 440, 441 and a coupler 443 capable of tying the string members 442.

That is, each of the upper part fastener 440 and the lower part fastener 441 comprises a support 430 having a ⊃-shaped cross section, a movable member 433 fitted inside the support 430 and rubber cushions 434, 435 secured to the opposite faces of the support 430 and the movable member 433. The upper part fastener 440 is provided with one adjusting screw 432 and the lower part fastener 441 provided with two adjusting screws 432.

Figure 39:
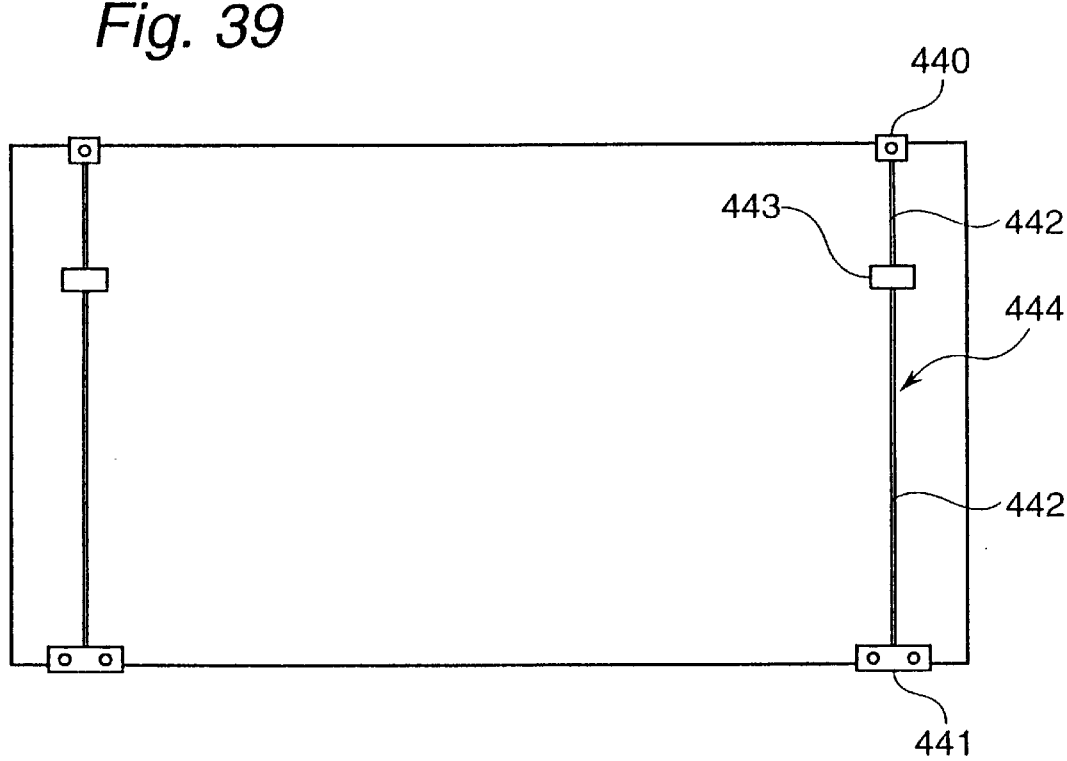
FIG. 39 is a front view showing the state of use of the third transporter.
Figure 40:
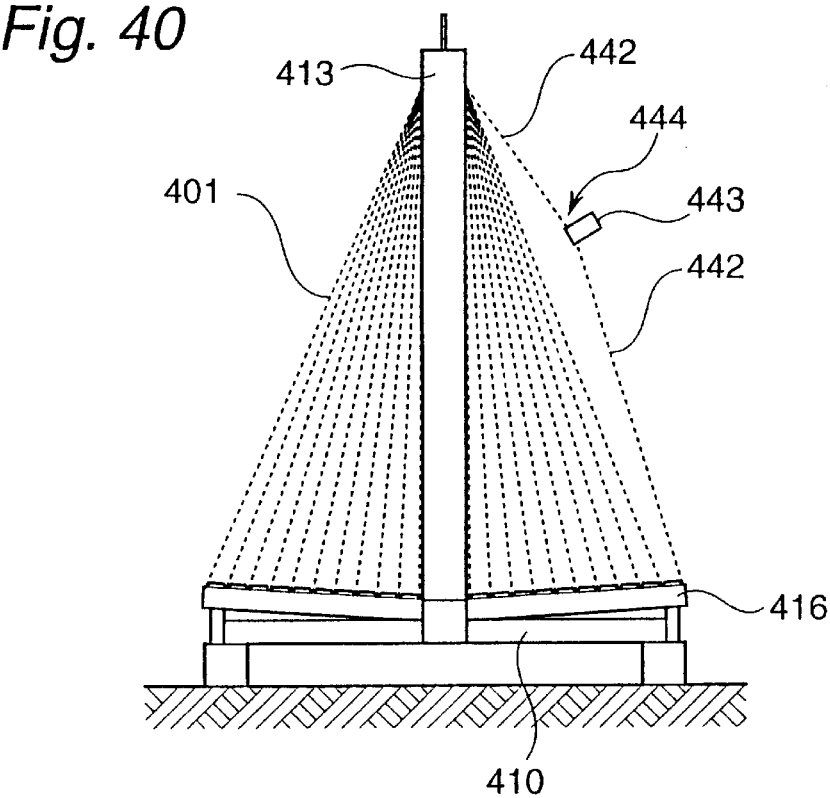
FIG. 40 is a side view explaining the state of antifouling wall panels during takeout.

Thus, referring to FIGS. 39 and 40, when one laid on the surface side is taken out from the antifouling wall panels 401 held standing against the pillar with specified spacings therebetween, the antifouling wall panel 401 is slightly raised, and its upper end is fitted with the upper part fastener 440 while its lower end is fitted, with the use of lower opening part, with the lower part fastener 441. The string members 442, 442 are tied by the coupler 443. The antifouling wall panel 401 is lifted and taken out by hand by the use of the tied string members 442, 442 and, in this state, the antifouling wall panel 401 can easily be applied to the wall surface to be rendered antifouling.

Figure 41:
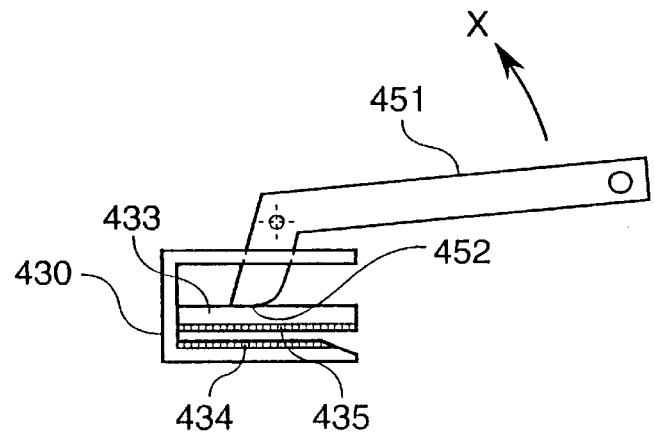
FIG. 41 is a schematic side view showing a modified form of the second and third transporters.
Figure 42:
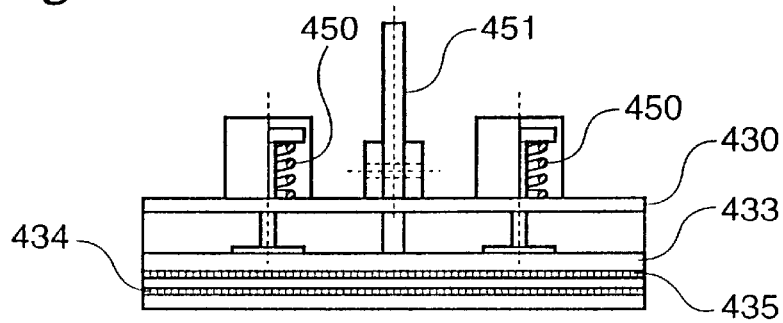
FIG. 42 is a partially cutaway right side view of FIG. 41.

Although the movable plate 433 is moved by driving the adjusting screws 432 to thereby hold the antifouling wall panel 401 between the movable plate 433 and the support 430 in the above second and third forms of transporters, a one-touch system as shown in FIGS. 41 and 42 can be employed in this form of transporter.

Illustratively, in this form of transporter, the moving member 433 is urged toward one side by springs 450, and a rotatable handle 451 is provided, which has a cam face 452 formed at its one end. This cam face 452 is brought into contact with the moving member 433 and, when the handle 452 is rotated in the X-direction as shown in FIG. 41, causes the moving member 433 to move while resisting the elastic force of the springs 450, so that the antifouling wall panel 401 is held between the rubber cushions 434, 435 secured to the opposite surfaces of the moving member 433 and the support 430. on the other hand, when the handle 452 is rotated in the reverse direction, the moving member 433 is restored to the original state by the elastic force of the springs 450.

EFFECT OF THE INVENTION

In the present invention, the antifouling panels can be easily and detachably fixed on the water contacting surface of structures to be rendered antifouling, so that construction of the antifouling wall can be effected at lowered cost within a shortened working period. Thus, for example, in the cooling water intake channel of thermal power stations, the work for replacing antifouling panels having lost antifouling effect by new ones can be conducted easily within a shortened working period, so that the total period for antifouling work and, hence, the period in which power generation must be halted can be shortened to a substantive extent. Further, any requirement for renewing part of antifouling panels can easily and quickly be coped with by removing only that part and installing new panels. Still further, the present invention enables easily fitting antifouling panels even where application of the antifouling paint is difficult.

In the antifouling wall structure of the present invention, the antifouling panels can firmly be secured to the wall surface of the structure to be rendered antifouling by means of fixing joint plates and lateral direction fixtures to thereby cover the wall surface without the need to make perforation at inner parts of the antifouling panels, Therefore, the occurrence of a difference in level between antifouling panels can be prevented.

Further, even if there is a slight error, the antifouling panels can be accurately fitted, so that extremely high accuracy is not required in the setting of the position at which the fixing joint plate is fitted. Not only this but also the above nonrequirement for perforation at inner parts of the antifouling panels enables easily and quickly constructing the antifouling wall structure.

In the antifouling wall structure of the present invention applied to a pipe structure, separately formed antifouling panels are detachably fitted on the inner wall surface of the pipe structure, so that the antifouling wall can be simply constructed at lowered cost not only in the already installed cooling water intake pipe but also in a new cooling water intake pipe. Moreover, this antifouling wall can be detached, so that, according to necessity, it is detached to thereby enable alternate use of other antifouling panels.

Thus, for rendering antifouling the water contacting surface of, for example, the cooling water intake pipe of thermal power stations, it has been necessary to remove oceanic life within a relatively short period of time, but, in the present invention, the period between oceanic life removals can be prolonged. Moreover, the antifouling panels having lost antifouling effect can be replaced by new ones, and detachment of the old antifouling panels is easy.

In the present invention, each antifouling panel consists of divisions, so that the production and carriage thereof are easy.

In the method of constructing the antifouling wall according to the present invention, not only can a few divisions be assembled into the antifouling wall on the inner wall surface of the pipe structure but also fitting work can be performed while causing divisions to be arranged in the ceiling portion to float underwater, so that fitting efficiency is high. Moreover, fitting of the antifouling panel and removal thereof from the pipe structure can be conducted by attaching and detaching the plate lock, so that assembly and disassembly work is easy.

The antifouling wall panel transporter of the present invention which is most suitable for use as a container enables the safekeeping and carriage of antifouling wall panels while causing them to stand against the pillar with spacings made therebetween in place of piling them one upon another. Thus, the use of curing sheets whose handling is difficult is rendered unnecessary, and the safekeeping, transportation and carriage into work site of antifouling wall panels can be efficiently carried out while avoiding the injury of coating film attributed to the weight of the antifouling wall panels and their mutual contact during the transportation.

The antifouling wall panel transporter of the present invention which is most suitable for use as a panel holder enables easily and securely taking out one by one from the antifouling wall panels arranged in the state of standing against the pillar with specified spacings held therebetween without injuring them. The antifouling wall panel can be fitted in the state of being taken out on the wall surface.

What is claimed is:

1. An antifouling pipe wall structure through which fluid such as seawater flows, comprising a pipe wall structure having detachably fitted on an inner wall entire surface thereof, antifouling panels which form a circular shape and conform to the shape of the inner wall surface and which consist of a plurality of divisions arranged in groups of three, the antifouling panel divisions consists of first divisions arranged on a ceiling part of the pipe structure, second divisions arranged on one side of the first divisions and third divisions arranged on the opposite side of the first divisions, and wherein the second divisions and the third divisions have respective edges lying in mutually abutting relationship and the abutting portions are detachably fixed to the inner entire surface of the pipe wall by threaded bolts and lock nuts and a plate lock extending along the flow of the fluid, and wherein said antifouling panel divisions contain on the inner entire surface thereof an antifouling paint layer and wherein each of the first, second and third divisions has the form of a substantially circular arc, the edge of the second division adjacent to the first division and the edge of the third division adjacent to the first division are each integrally fitted with fitting pieces which are integrally molded with the second division and the third division or are separately molded and are fixed with screws to the respective edges of the second and third divisions in a manner such that the second division fitting piece overlaps one edge of the first division and the third division fitting piece overlaps the other edge of the first division.

2. The antifouling pipe wall structure of claim 1, wherein the antifouling panels comprise a base material layer and an antifouling top coating layer in that order.

3. The antifouling pipe wall structure of claim 1, wherein the antifouling panels comprise a base material layer, an undercoating layer, an intermediate coating layer and an antifouling top coating layer in that order.

4. An antifouling wall structure for use in pipe structure through which fluid such as seawater flows, comprising a pipe wall structure to be rendered antifouling, said antifouling structure containing replaceable and detachable antifouling panels, which form a circular shape, on the inner wall entire surface of the pipe structure, said antifouling panels consisting of a plurality of divisions, which form a circular shape, said water contacting surface of the divisions is disposed to be exposed to the water contacting side of the pipe structure and is disposed on the inner wall surface of the pipe structure along the flow direction of the fluid, at least one other division is detachably disposed on the end side of one division, and extending along the flow direction of the fluid, by means of fitting pieces formed on the one end of the other divisions, said divisions are disposed on the inner surface of the pipe structure in the form of a loop by means of said fitting pieces and the final ends of the loop of the divisions having no fitting pieces are detachably fitted to each other by means of a plate lock extending along the flow direction of the fluid, whereby, said antifouling panels are replaceably and detachably fitted on the inner wall entire surface of the pipe structure.

5. The antifouling wall structure as claimed in claim 4, wherein said division comprises a base material layer made from synthetic resin and antifouling paint layer which forms the water contacting surface.

6. The antifouling wall structure as claimed in claim 4 or 5, wherein said antifouling wall structure for use in pipe structure is a wall structure of a cooling water intake channel or drain of power stations.

7. An antifouling pipe wall structure through which fluid such as seawater flows, comprising a pipe wall structure having detachably fitted on an inner wall surface thereof, antifouling panels which confirm to the shape of the inner wall surface and which consist of a plurality of divisions arranged in groups of three, the antifouling panel divisions consists of a first division arranged on a ceiling part of the pipe structure, a second division arranged on one side of the first division and a third division arranged on the opposite side of the first division, and wherein the second division and the third division have respective edges lying in mutually abutting relationships and the abutting portions are detachably fixed to the pipe wall by threaded bolts and lock nuts and a plate lock extending along the flow of the fluid, and wherein said antifouling panel divisions contain on the inner surface thereof an antifouling paint layer, and wherein each of the first, second and third divisions has the form of a substantially circular arc, the edge of the second division adjacent to the first division and the edge of the third division adjacent to the first division are each integrally fitted with fitting pieces which are integrally molded with the second division and the third division or are separately molded and are fixed with screws to the respective edges of the second and third divisions in a manner such that the second division fitting piece overlaps one edge of the first division and the third division fitting piece overlaps the other edge of the first division.

* * * * *